United States Patent
Flinsenberg et al.

(10) Patent No.: US 9,894,741 B2
(45) Date of Patent: Feb. 13, 2018

(54) INTELLIGENT LIGHTING SYSTEM WITH PREDICTIVE MAINTENANCE SCHEDULING AND METHOD OF OPERATION THEREOF

(71) Applicant: PHILIPS LIGHTING HOLDING B.V., Eindhoven (NL)

(72) Inventors: Ingrid Christina Maria Flinsenberg, Eindhoven (NL); Johanna Maria De Bont, Eindhoven (NL); Alexandre Georgievich Sinitsyn, Eindhoven (NL); Saeed Reza Bagheri, Croton On Hudson, NY (US); Parikshit Shah, White Plains, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/123,599

(22) PCT Filed: Feb. 17, 2015

(86) PCT No.: PCT/IB2015/051159
§ 371 (c)(1),
(2) Date: Sep. 2, 2016

(87) PCT Pub. No.: WO2015/132687
PCT Pub. Date: Sep. 11, 2015

(65) Prior Publication Data
US 2017/0231071 A1    Aug. 10, 2017

Related U.S. Application Data

(60) Provisional application No. 61/948,871, filed on Mar. 6, 2014.

(51) Int. Cl.
H05B 37/04    (2006.01)
H05B 37/03    (2006.01)
(Continued)

(52) U.S. Cl.
CPC .......... *H05B 37/03* (2013.01); *G05B 13/048* (2013.01); *H05B 37/0272* (2013.01)

(58) Field of Classification Search
CPC ... H05B 37/0272; H05B 37/03; G05B 13/048
(Continued)

(56) References Cited

U.S. PATENT DOCUMENTS

2008/0147337 A1    6/2008  Walters et al.
2008/0278350 A1*  11/2008  Berkhahn .......... H05B 33/0848
                                                                    340/945

(Continued)

FOREIGN PATENT DOCUMENTS

EP          1916878 A1    4/2008
WO     2010073232 A1    7/2010

OTHER PUBLICATIONS

Accenture 2013 Technology Vision. http://www.accenture.com/SiteCollectionDocuments/PDF/Accenture-Technology-Vision-2013.pdf.
(Continued)

*Primary Examiner* — Don Le

(57) ABSTRACT

Alighting system may include: at least one controller which may be configured to: obtain lighting logging data including feature information related to features of the lighting system and obtained from a plurality of feature spaces; determine lighting prediction data which predicts at least one component failure in the lighting system at a future time in accordance with the lighting logging data and include at least one complex feature; model predicted component failures which are predicted to occur at a future time in accordance with the lighting prediction data and maintenance cost; and/or store the predicted component failures model in a memory.

12 Claims, 9 Drawing Sheets

(51) Int. Cl.
  *H05B 37/02* (2006.01)
  *G05B 13/04* (2006.01)
(58) Field of Classification Search
  USPC .......................................................... 315/130
  See application file for complete search history.

(56) References Cited

U.S. PATENT DOCUMENTS

| | | | |
|---|---|---|---|
| 2010/0262297 A1 | 10/2010 | Shloush et al. | |
| 2011/0307112 A1* | 12/2011 | Barrilleaux | H05B 37/02 700/291 |
| 2013/0120387 A1 | 5/2013 | Mueller | |
| 2013/0181614 A1 | 7/2013 | Agrawak | |
| 2013/0271004 A1* | 10/2013 | Min | H05B 33/0842 315/112 |
| 2014/0055041 A1* | 2/2014 | Ramer | H05B 37/0209 315/153 |
| 2014/0117852 A1* | 5/2014 | Zhai | H05B 37/0245 315/86 |
| 2014/0191662 A1* | 7/2014 | Lee | H05B 37/0263 315/132 |
| 2014/0375222 A1* | 12/2014 | Rains, Jr. | H05B 37/0245 315/158 |
| 2016/0007426 A1* | 1/2016 | Ashdown | H05B 37/0227 700/90 |
| 2017/0051933 A1* | 2/2017 | Verhoeven | F24F 11/006 |

OTHER PUBLICATIONS

Big data: The next frontier for innovation, competition, and productivity. http://www.mckinsey.com/insights/business_technology/big_data_the_next_frontier_for_innovation.

Philips Starsense Outdoor Lighting System. http://www.lighting.philips.nl/pwc_li/nl_nl/connect/Assets/downloads/online-documentatie/Brochure_starsense_NL.pdf.

Hsich et al, Identifying Important Risk Factors for Survival in Patient With Systolic Heart Failure Using Random Survival Forests, Circulation: Cardiovascular Quality and Outcomes, vol. 4, pp. 39-45, 2011.

Dulla, Haimonti, et al. "Estimating the Time Between Failures of Electrical Feeders in the New York Power Grid." Next Generation Data Mining Summit, NGDM (2009).

Chi, Der-Jang, Ching-Chiang Yeh, and Ming-Cheng Lai. "A Hybrid Approach of DEA, rough set theory and random forests for credit rating." International Journal of Innovative Computing, Information and Control 7.8 (2011): 4885-4897.

Breiman, Manual—Selling Up, Using, and Understanding Random Forests V4.0, available at: ftp://ftp.stalberkeley.edu/pub/users/breiman/Using random forests v4.0.pdf , 2003.

* cited by examiner

INTELLIGENT LIGHTING SYSTEM WITH PREDICTIVE MAINTENANCE SCHEDULING AND METHOD OF OPERATION THEREOF

CROSS-REFERENCE TO PRIOR APPLICATIONS

This application is the U.S. National Phase application under 35 U.S.C. § 371 of International Application No. PCT/IB2015/051159, filed on Feb. 17, 2015, which claims the benefit of U.S. Provisional Application No. 61/948,871, filed on Mar. 6, 2014. These applications are hereby incorporated by reference herein.

The present system relates to an intelligent lighting system and, more particularly, to a lighting system that processes information from a plurality of information spaces for predicting and scheduling maintenance operations, and a method of operation thereof.

Typically, in street lighting systems, non-functioning lamps are replaced with new lamps by maintenance crews in response to service calls which report the non-functioning lamps. This process requires that lamps be blown out before they are replaced which can increase user inconvenience. Moreover, if lamps are replaced early before they fail, some lamp life may be lost which can increase overall maintenance costs.

Although data storage is becoming cheaper and abundant, it remains costly to manage, maintain, and process large datasets. Furthermore, typically much of the data is removed before processing because it is not relevant, introduces noise, or slows the analysis. Noise, missing data and erroneous data is very common in large databases. Without sufficient data quality, data analytics applications cannot supply the necessary high quality conclusions. Finally, sending large amounts of data from the outdoor lighting system requires a more complex, and costly, lighting system design that can handle the resulting high network traffic and storage requirements.

The system(s), device(s), method(s), user interface(s), computer program(s), processes, etc. (hereinafter each of which will be referred to as system, unless the context indicates otherwise), described herein address problems in prior art systems.

In accordance with embodiments of the present system, there is disclosed a lighting system which may include: at least one controller which is configured to: obtain lighting logging data including feature information related to features of the lighting system and obtained from a plurality of feature spaces; determine lighting prediction data which predicts at least one component failure in the lighting system at a future time in accordance with the lighting logging data and include at least one complex feature; model predicted component failures which are predicted to occur at a future time in accordance with the lighting prediction data and maintenance cost; and store the modeled predicted component failures in a memory.

It is further envisioned that the controller may be further configured to render the modeled predicted component failures on a display of the lighting system. It is also envisioned that the controller may be further configured to obtain the lighting logging data from at least one of a lamp electrical portion, a system operating information portion, sensors, an installation configuration portion, a weather information portion, a traffic portion, and a crime portion. It is also envisioned that the lighting system may further include a plurality of lamps, and the modeled predicted component failures may include predicted lamp failures of two or more lamps of the plurality of lamps and corresponding predicted failure times. It is further envisioned that the controller may be further configured to cluster at least two of the predicted lamps failures in accordance with geophysical location and predicted failure times of corresponding lamps. However, in yet other embodiments only a cluster may include at least one lamp. Moreover, it is envisioned that the controller may be further configured to schedule maintenance to replace the lamps of the cluster at a determined time that is determined to be optimal with respect to the cluster.

For example, assuming the system has predicted number of predicted lamp failures (e.g., at one or more future times), the system may then perform clustering (and in-time scheduling of lamps replacement) to minimize the cost of maintenance in accordance with a mathematical model which may be known as a cost-function. Then, using the cost function, different cost types may be mathematically taken into consideration by the system such as fixed cost of making a replacement round ((e.g., which may include repair equipment cost, personnel cost (fixed salary), etc.) which may be considered independent of number/location of lamps), variable cost of making a replacement round ((e.g., which may include fuel costs for the truck, salary of personnel (e.g., hourly, overtime), etc.) and which may be dependent upon at least one of number and location of lamps to be repaired), cost of replacing a lamp (e.g., of a plurality of lamps which are predicted to failure) too early (e.g., wasted lifetime), cost of replacing a lamp (e.g., of the plurality of lamps) too late (e.g., performance penalties, citizens' complaints, brand damage, etc.), and the cost of the replacing hardware. Given this cost-function, the system may determine one or more clusters (e.g., by clustering) and a time (e.g., a future day, date, time) for which the cost may be determine to be optimally minimized for replacing lamps at least one corresponding cluster. The system may use heuristics for performing the clustering.

In accordance with yet other embodiments of the present system, there is disclosed a method of determining performance of a lighting system, the method may be performed by at least one controller of the lighting system and may include one or more acts of: obtaining lighting logging data including feature information related to features of the lighting system and obtained from a plurality of feature spaces; determining lighting prediction data which predicts at least one component failure in the lighting system at a future time in accordance with the lighting logging data and includes at least one complex feature; modeling predicted component failures which are predicted to occur at a future time in accordance with the lighting prediction data and maintenance cost; and storing the modeled predicted component failures in a memory.

It is also envisioned that the method may further include an act of rendering the modeled predicted component failures on a display of the lighting system. It also envisioned that the method may further include an act of obtaining the lighting logging data from at least one of a lamp electrical portion, a system operating information portion, sensors, an installation configuration portion, a weather information portion, a traffic portion, and a crime portion. In accordance with some embodiments, the lighting system may further include a plurality of lamps, and the modeled predicted component failures may include predicted lamp failures of two or more lamps of the plurality of lamps and corresponding predicted failure times. The method may further include an act of clustering at least two of the predicted lamps failures in accordance with geophysical location and predicted failure times of corresponding lamps. In accordance with some embodiments, the method may further include an act of scheduling maintenance to replace the lamps of the cluster at a determined time that is determined to be optimal with respect to the cluster.

In accordance with yet other embodiments of the present system, there is disclosed a computer program stored on a computer readable memory medium, the computer program configured to determine performance of a lighting system, the computer program including: a program portion configured to: obtain lighting logging data including feature information related to features of the lighting system and obtained from a plurality of feature spaces; determine lighting prediction data which predicts at least one component failure in the lighting system at a future time in accordance with the lighting logging data and include at least one complex feature; model predicted component failures which are predicted to occur at a future time in accordance with the lighting prediction data and maintenance cost; and store the modeled predicted component failures in a memory a memory of the lighting system.

In accordance with some embodiments, the program portion may be further configured to render the modeled predicted component failures on a display of the lighting system. It is also envisioned that the program portion may be further configured to obtain the lighting logging data from at least one of a lamp electrical portion, a system operating information portion, sensors, an installation configuration portion, a weather information portion, a traffic portion, and a crime portion. It is also envisioned that the lighting system may further include a plurality of lamps, and the modeled predicted component failures may include predicted lamp failures of two or more lamps of the plurality of lamps and corresponding predicted failure times. In accordance with some embodiments, the program portion may be further configured to cluster at least two of the predicted lamps failures in accordance with geophysical location and predicted failure times of corresponding lamps. Further, the program portion may be further configured to schedule maintenance to replace the lamps of the cluster at a determined time that is determined to be optimal with respect to the cluster.

In accordance with yet further embodiments of the present system, there is disclosed a lighting system which may include at least one controller which may be configured to: obtain lighting logging data related to features of a lighting system at a current time; determine lighting prediction data comprising at least one complex feature in accordance with the lighting logging data related to features of the lighting system at the current time; form a model of predicted component failures in the lighting system predicted to occur at a future time in accordance with the determined lighting prediction data; and store the predicted component failures model in a memory. It is also envisioned that the controller may be further configured to collect lighting logging data at the future time, determine true outcomes of predictions based upon the lighting logging data collected at the future time and the model of predicted component failures, and update the model of predicted component failures in accordance with the true outcomes of predictions. It is also envisioned that the controller may further determine latest lighting prediction data comprising at least one complex feature in accordance with the lighting logging data related to features of the lighting system at the future time; and/or form a model of predicted component failures in the lighting system predicted to occur at another future time relative to the future time in accordance with the determined latest lighting prediction data and the updated model.

The invention is explained in further detail, and by way of example, with reference to the accompanying drawings wherein.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques, and methods are omitted so as not to obscure the description of the present system. It should be expressly understood that the drawings are included for illustrative purposes and do not represent the entire scope of the present system. In the accompanying drawings, like reference numbers in different drawings may designate similar elements.

Figure 1A:
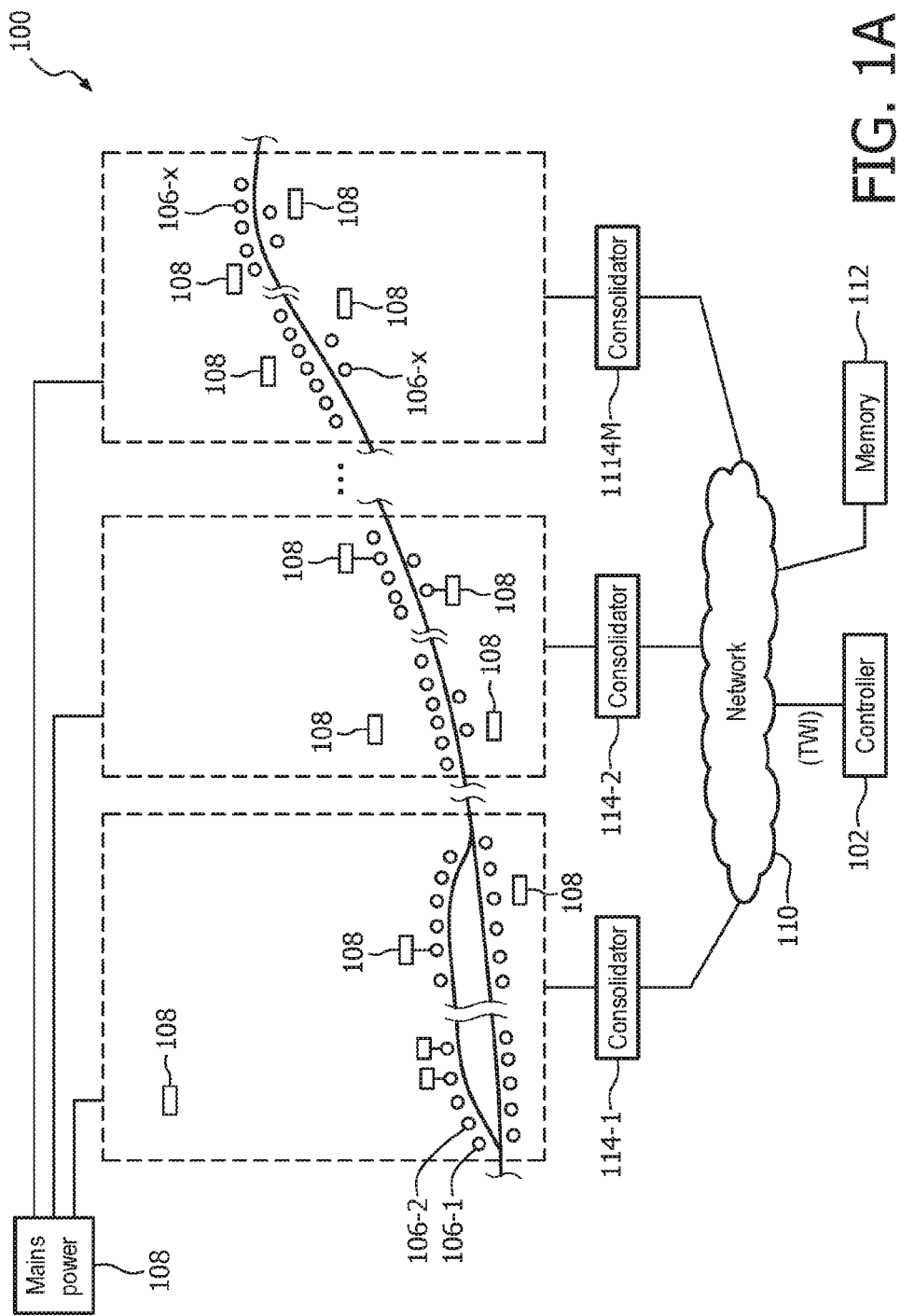
FIG. 1A shows a schematic of a lighting system 100 in accordance with embodiments of the present system.

FIG. 1A shows a schematic of a lighting system 100 in accordance with embodiments of the present system. The lighting system 100 may include a controller 102, lightpoints 106-1-106-N (generally 106-x), sensors 108, a network 110, a memory 112, information consolidators 114-1 through 114-P (generally 114-x), etc. One of more of the lightpoints 106-x may form one or more corresponding groups of illuminators 104-1-104-M, if desired, and may include associated sensors of the sensors 108.

The controller 102 may control the overall operation of the system 100 and may communicate with one of more of the light-points 106-x, the sensors 108, the memory 112, the consolidators 114, etc., via the network 110. The controller 102 may include one or more logic devices such a processors (e.g., micro-processors), logic switches, etc. and may be configured (e.g., using hardware, software, and/or firmware) to operate in accordance with embodiments of the present system.

The memory 112 may include any suitable non-transitory memory and may include local and/or distributed memories. For example, the memory 112 may include a plurality of database such as: (A) an outdoor lighting database; (B) a public database; (C) a reliability model database; and/or (D) a prediction model database as will be discussed below. One or more of these databases may be separate from, or formed integrally with, each other and may store information in any suitable format.

The network 110 may include one or more networks which may enable communication between or more of the controller 102, the light-points 106-x, the sensors 108, the memory 112, the consolidators 114-x, etc., using any suitable transmission scheme such as a wired and/or wireless communication schemes. Accordingly, the network 110 may include one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, an ad-hoc network, etc.

The sensors 108 may be distributed throughout the lighting system 100 and may include sensors which may sense information related to the lighting system 100 as will be described with respect to the discussion of FIGS. 1B and 2 below and form corresponding sensor information in any suitable format. For example, the sensor information which may be provide to one or more corresponding consolidators 114-x and/or to the controller 102 for further processing. One or more of the sensors 108 may be located integrally with (e.g., local), or remotely from, a corresponding lightpoint 106-x. In yet other embodiments, one or more of the sensors 108 may be associated with one or more of these lightpoints 106-x based upon a grouping and/or network or geophysical proximity with one or more of the lightpoints 106-x. For example, a sensor 108 may be associated with one or more closest lightpoints 106-x as may be determined using geophysical location information. The sensor information may include information identifying reporting sensors 108 or the sensors 108.

The lightpoints 106-x may include any suitable illumination sources such as one or more lamps. One or more of the lightpoints 106-x may be the same as, or different from, other lightpoints 106-x and may include a suitable housing such as a luminaire. For the sake of clarity, it will be assumed that all of the lightpoints 106-x are similar to each other and include a single corresponding lamp. The lamp may include any suitable illumination source(s) such as an arc type lamp (e.g., a SON lamp, a MH lamp, a fluorescent lamp, etc.), a light emitting diode (LED) lamp, a filament-type lamp (e.g., a quartz lamp, etc.). However, for the sake of clarity, it will be assumed that each lightpoint 106-x includes only a single lamp. Further, each of the lightpoints 106-x may be referred to as lamps 106-x. One or more of the lightpoints 106-x may be mounted in suitable location such as on poles (e.g., light poles), walls, floors, ceilings, bridges, etc. in indoor and/or outdoor locations and may include any suitable luminaire. For example, in some embodiments, a group of lightpoints 106-x may include a roadway/walkway luminaires mounted in a certain geophysical location of a municipal lighting system. It is further envisioned that one or more of the lightpoints 106-x may be controlled by the controller 102 to output desired lighting characteristics such as fixed and/or variable intensity illumination, fixed and/or variable focus illumination, fixed and/or variable duration illumination, fixed and/or variable spectrum (e.g., color) illumination, etc. and may provide corresponding illumination information. One or more of the lightpoints 106-x may include actuators such as switches to control power provided to illumination sources (e.g., lamps) of corresponding lightpoints 106-x. For example, in some embodiments a single switch may be used to control power for activating a plurality of lightpoints 106-x.

The consolidators 114-x may obtain lighting logging data (LLD) from corresponding lightpoints 106-x and may process the corresponding LLD to form transport information (ti) which may be provided to the controller 102 for further processing. The LLD may be received in a raw format and may include information such as the feature information (fi), which is related to the features (f) of the lighting system, from corresponding information sources (ISs). Then, one or more of the consolidators 114-x may process the LLD and form corresponding transport information (TI) as will be discussed elsewhere. Generally, the consolidators 114-x may analyze the LLD to determine erroneous and/or missing information and correct and/or replace information that is determined to be erroneous and/or missing (e.g., with estimated data) as will be discussed elsewhere. In some embodiments it is envisioned that the controller 102 may include one more accumulators 114-x. For the sake of clarity, missing and erroneous data may be commonly referred to as erroneous data.

Figure 1B:
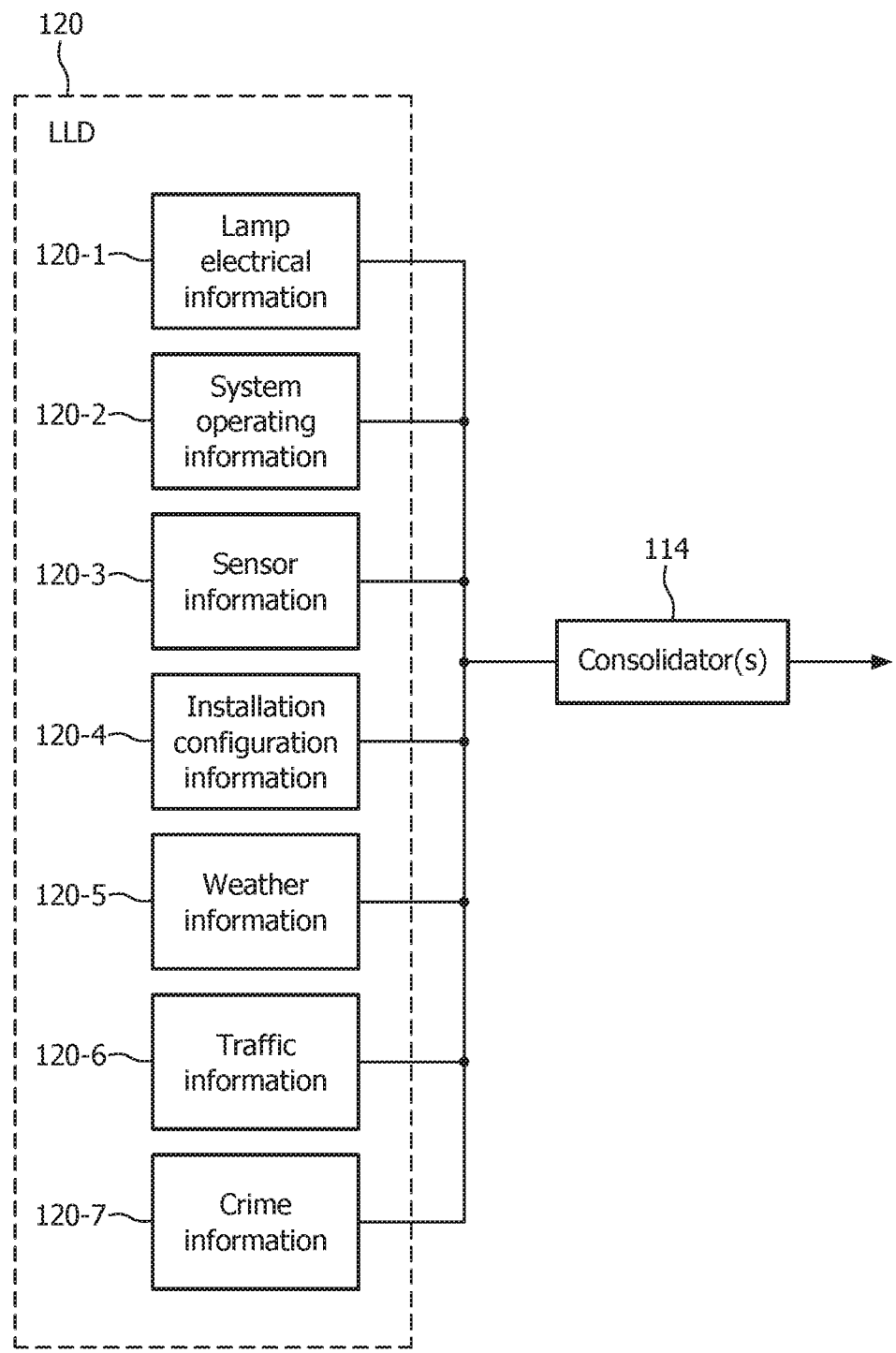
FIG. 1B shows a schematic of a portion of the lighting system in accordance with embodiments of the present system.

FIG. 1B shows a schematic of a portion of the lighting system 100 in accordance with embodiments of the present system. The lighting system 100 may include a lighting logging data (LLD) portion 120 and a consolidator 114. The LLD portion 120 may include a plurality of information sources such as a lamp electrical information portion 120-1 which may provide lamp electrical information, a system operating information portion 120-2 which may provide system operating information, sensors 120-3 which may provide sensor information, an installation configuration portion 120-4 which may provide installation configuration information, a weather information portion 120-5 which may provide weather information, a traffic portion 120-6 which may provide traffic information, and a crime portion 120-7 which may provide crime information. Each information source 120-x may provide information which corresponds with a different feature space. Thus, for example, the sensor information may include information of a first feature space and the weather information may include information of a different feature space. The lamp electrical information may include information related to one or more of voltage, power, current, power factor, energy consumption, realized dimming level, color point, hue, saturation, brightness for one or more lamps 106-x of the lighting system 100. The system operating information may include information related to one or more of mains voltage, lamp control errors (e.g., errors in controlling lamps), lamp operating schedules, and requested dimming levels, of the lighting system 100. The sensor information may include information related to one or more of light level, ambient temperature, lamp internal temperature, humidity, and presence, and sensed traffic of the system 100. The configuration information may include information related to one or more of lamp location (e.g., determined using any suitable method such as by using a global positioning system (GPS)), lamp type (e.g., SON, LED, fluorescent, incandescent, etc.), brand name (e.g. Xitanium™ 80led350 mA 96 W Speedstar™ BGP322GRN84), lamp wattage, lamp installation date, and average lifetime of one or more lamps 106-x of the system 100. The weather information may include information related to one or more of ambient temperature, rainfall, humidity, pressure, and wind speed determined for one or more locations in the lighting system. The provide traffic information may include information related to one or more of traffic density, traffic type, traffic speed, accidents, road type related to one or more locations of the system 100. The crime information may include information related to one or more of police reports, robberies, burglary, accidents, and theft related to one or more locations in the system 100.

The weather portion 120-5 may obtain the weather information from any suitable source such as Accuweather™, etc. via, for example, the Internet. The weather information may include past, present and/or future weather (forecasted) information. Similarly, the crime portion 120-x may obtain the crime information from any suitable source such as a police or law enforcement agency via, for example, the Internet. The crime information may include past, present, and/or future (e.g., forecasted) crime information. Further, the traffic information may be obtained from any suitable source such as a traffic-reporting source via, for example, the Internet. The traffic information may include past, present, and/or future (e.g., forecasted) traffic information.

The lighting logging data (LLD) may include one or more of the lamp electrical information, the operating information, the sensor information, the installation configuration information, the weather information, the traffic information, and the crime information each of which may form a part of feature information (FI) which may include information related to features (f) of the system. Thus, the LLD may include information related to features (f) of the system. One or more of the lamp electrical information, the operating information, the sensor information, the installation configuration information, the weather information, the traffic information, and the crime information may be collected temporally (e.g., every second, minute, hour, daily, monthly, etc.) at one or more times. For example, the crime information may be collected once a month. However, the sensor information may be collected every 20 seconds. Thus, for example, the process may include collection time information which may set forth times and/or schedules at which corresponding information is to be collected. The collection time information may be set by the system and/or user and may be stored in a memory of the system for later use.

The consolidator 114 may include one or more consolidators 114-x which may receive corresponding portions of the LLD from corresponding portions of the lighting system and may process the LLD to consolidate and/or clean the LLD so as to form transport worthy information such as transport information (TI) as will be discussed below.

Figure 2:
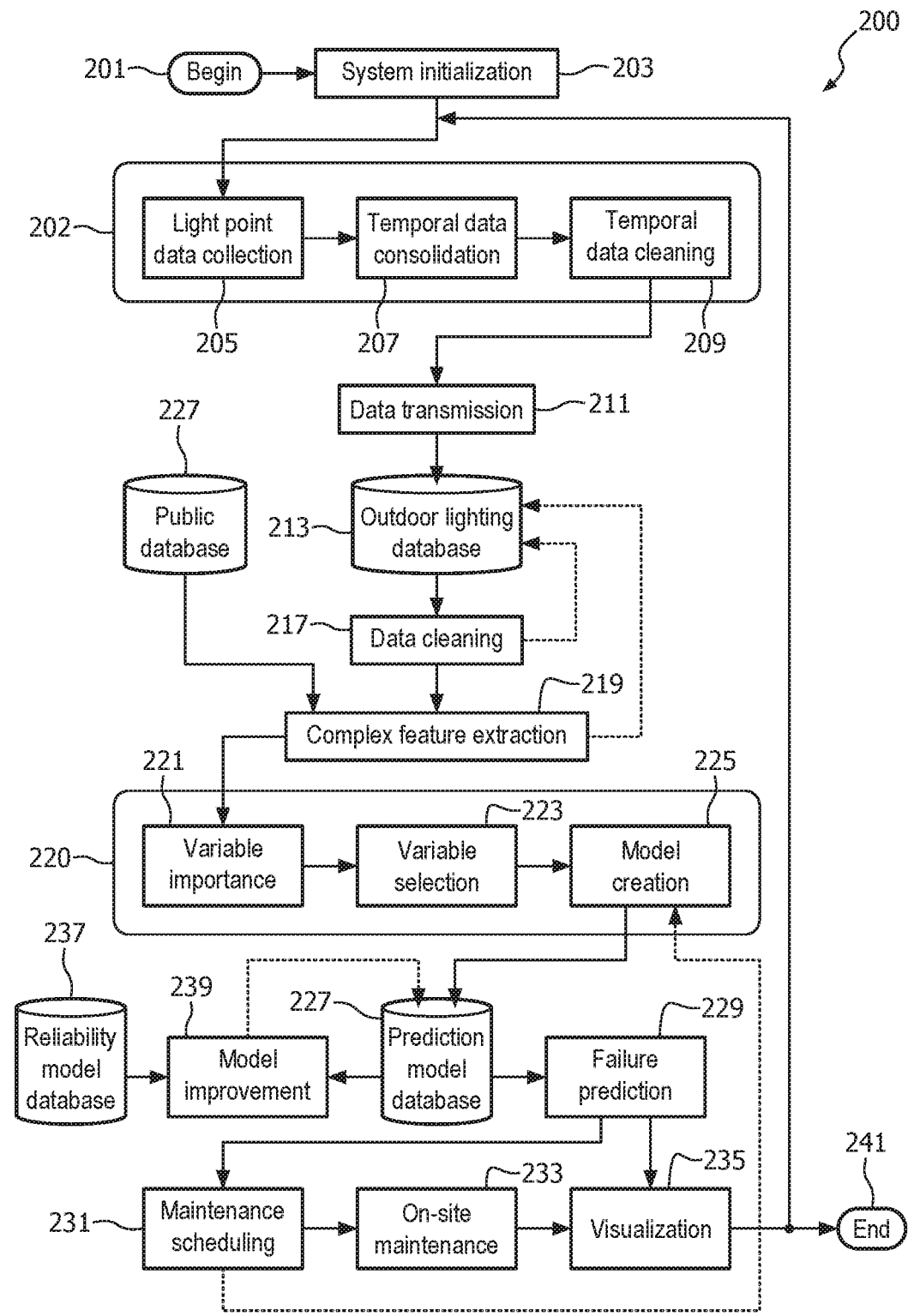
FIG. 2 is a flow diagram that illustrates a process 200 performed by a light system operating accordance with embodiments of the present system.

FIG. 2 is a flow diagram that illustrates a process 200 performed by a light system operating accordance with embodiments of the present system. The process 200 may be performed using one or more computers communicating over a network and may obtain information from, and/or store information to one or more memories which may be local and/or remote from each other. The process 200 can include one of more of the following acts. Further, one or more of these acts may be combined and/or separated into sub-acts, if desired. Further, one or more of these acts may be skipped depending upon settings. In operation, the process may start during act 201 and then proceed to act 203.

During act 203, the process may perform an initialization process. The initialization process may initialize one or more portions of the system such as lightpoints (hereinafter lamps for the sake of clarity), sensors, etc. The process may further perform a discovery process prior to or after the initialization process to discover portions of the system such as lamps, sensors, memories, power supplies (e.g., mains power, backup power, etc.), networks, etc. Further, the process may provide operating instructions (e.g., operational commands, etc.) to portions of the system such as the lamps and/or the sensors. During the initialization, the process may synch data such as operating data, time data, etc. During the discovery process the process may retrieve system operating information from a memory of the system and/or establish network connections and/or memory access. After completing act 203, the process may continue to act 205.

During act 205, the process may perform a lightpoint (e.g., lamp) data collection process in which the LLD may be obtained from the LLD portion 120. The LLD may include feature information (fi). The LLD or portions thereof may be determined and/or transmitted temporally at various times (e.g., each of which may be considered a time step) such as at periodic and/or non-periodic intervals (e.g., temporally) and/or in response to a query from, for example, the consolidators 114-x and/or the controller 102. In some embodiments, portions of the LLD portion such as the sensors (e.g., 120-3) may determine corresponding sensor information (e.g., which may form at least part of the fi) once every 5 minutes (each time corresponding with a time step) and thereafter transmit the sensor information to a corresponding consolidator 114-x. After completing act 205, the process may continue to act 207.

During act 207, the process may perform a temporal data consolidation process to consolidate the collected LLD which includes the fi. For the sake of clarity, the fi and features f contained within may be discussed below rather than the LLD. However, operations performed on the fi may also be considered as operations performed upon the LLD and vice versa. Referring to the consolidation, the process may consolidate the fi and form a full input data set X based upon the input fi as will be discussed below. This data consolidation process may be performed using any suitable method. For example, in some embodiments, the fi may be consolidated using the following mathematical methods so as to form a corresponding full input data set X which is based upon the fi as follows.

For example, assuming that the hours of a day h may be represented as:

$$h \in H = [0,23],\qquad\text{Eq. (1)}$$

the day number (counting days since 1 Jan. 1970) may be represented as:

$$d \in D = [0,\infty).\qquad\text{Eq. (2)}$$

Then, time t, may be defined as:

$$t = \begin{cases} d, & \text{if } h < 12 \\ d+1, & \text{if } h \geq 12 \end{cases}.\qquad\text{Eq. (3)}$$

Thus, the process may determine whether h is less than twelve and set the time t equal to d if it is determined that h is less than twelve. However, if it is determined that h is not less than twelve (e.g., h is greater than or equal to twelve), then the process may set the time t equal to d+1.

Then, assuming T is the set of all times t: $T \subset [0,\infty)$ and F may be the set of features f that are logged in the system:

$$F = \{f_1, \ldots, f_{nF}\}.\qquad\text{Eq. (4)}$$

where nF represents the number of features in the set F.

With regard to the features f, the features f may represent various information related the system or portions thereof such as: burning hours, lamp voltage, current, power, power factor, mains voltage, energy usage, number of lamp switches, number of dimming level changes, difference between the dimming command and the dimming result, delay between the dimming command and the dimming action, dimming level, duration of being set at each dimming level, success of a dimming request (e.g., successful, not successful), component temperature, lumen output, ambient temperature, air pressure, wind speed, wind direction, precipitation, solar power, cloud cover, moon phase, sunrise time, sunset time, natural light intensity, altitude, lamp failure, ballast failure, lamp controller failure (e.g., a failure of the electronics controlling a corresponding lamp), photocell failure, maintenance visit, traffic count per traffic type, and/or crime rate. However, the features f may vary based upon lighting system type and/or configuration. Further, when consolidating the features f, temporal data may be an arithmetic consolidation of features within the same time step.

Some of the features f may be linked (e.g., associated with) to one or more lamps based upon proximity such as geophysical proximity between a lamp and a corresponding feature f such as a weather report. Thus, the process may link a weather report for a certain area with one or more lamps that are a determined to be within this certain area. The process may do this using any suitable method such as matching a determined geophysical location of a lamp with weather information corresponding to the location of the lamp. Further, any suitable method may be used to determine geophysical location(s) of one or more portions of the system (such as one or more lamps and/or sensors of the system) such as by using global positioning system (GPS) coordinates, geophysical grid coordinates, system location, etc.

Upon receiving the fi, the fi may be processed as follows. For example, assuming an observation o be formed by the process and which may represent one particular realization value of a particular feature for a particular lamp at some time t and which may be denoted by:

$$o=(id,t,l,f,v),\qquad \text{Eq. (5)}$$

where $v \in \Re$ indicates the observation value of a lamp l (of a lightpoint) at time t from feature f, id is a unique identifier of the lamp and l may mathematically define a lamp pole of nL lamp poles of the lighting system as described with reference to Eq. (14) below, and L is the set of all of nL lamp poles as defined in Eq. (15) below and R represents a set of all real numbers. Thus, l may be considered an element of the set of lamps L. Then, an entire set of observations o may be denoted by:

$$O=\{o_1,\ldots,o_{nO}|t\in T, l\in L, f\in F\}\qquad \text{Eq. (6)}$$

where T and F are described above.

There may be multiple observations o for each unique combination of a lamp l, time t, and feature f. Let the set of all n observations for a single time t, lamp l, and feature f, be given by a function $\Omega: T\times L\times F \to \Re^n$, where:

$$\Omega(t,l,f)=\{v_1,\ldots,v_n | o_i=(id_i,t,l,f,v_i)\in O\}\qquad \text{Eq. (7)}$$

Given the set of observations O, a data point x may be defined as:

$$x = \left(t, \ell, f, \frac{1}{|\Omega(t, \ell, f)|} \sum_{v \in \Omega(t,\ell,f)} v,\right.\qquad \text{Eq. (8)}$$

$$\left.\sqrt{\frac{1}{|\Omega(t, \ell, f)|} \sum_{v \in \Omega(t,\ell,f)} \left(v - \frac{1}{|\Omega(t, \ell, f)|} \sum_{v \in \Omega(t,\ell,f)} v\right)^2},\right.$$

$$\left.\max_{v \in \Omega(t,\ell,f)}(v), \min_{v \in \Omega(t,\ell,f)}(v), |\Omega(t, \ell, f)|\right)$$

Then, the full input data set X is may be given by:

$$X=\{x_1,\ldots,x_{nX}|t\in T, l\in L, f\in F\}\qquad \text{Eq. (9)}$$

Then, assuming that $\xi(x,i)$ denotes the $i+3^{th}$ element of a tuple x, i.e., $\xi(x,1)$ indicates an average value of the observations O, and $\xi(x,5)$ denotes a number of observations used to create a data point x. The mean value, standard deviation, maximum, minimum, and/or number of observations may be determined for each unique combination of a lamp, a time, and/or a feature. The process may request these for each such unique combination.

The data points for a given time t, lamp l, and feature f, can be given by a function:

$$\Xi:T\times L\times F\to X.\qquad \text{Eq. (10)}$$

After completing act 207, the process may continue to act 209.

During act 209, the process may perform a cleaning process to clean the full input data set X so as to correct any data which determined to be missing and/or to replace any data that is determined to be erroneous.

For example, during act 209, the process may preprocess the full input data set X to correct all data that is determined to be erroneous and replace any data that is determined to be missing. Thus, recognized errors in the full input data set X may be corrected.

For example, to correct the data of the full input data set X, the process may define for each feature $f\in F$ an upper bound (e.g., an upper threshold value) and a lower bound (e.g., a lower threshold value), fup and flow, respectively, that indicates proper data range for a corresponding feature f. In other words, for each feature $f\in F$, a normal range within the upper and lower thresholds may be defined. For some features, the normal range may be pre-defined, for example, the power factor may be expected to be between 0 and 1. For features the normal range may be learned, e.g., for mains power, temperature. First, all observations $o=(id,t,l,f,v)$ for which it is determined that $v\le f_{low}$ or $v\ge f_{up}$ are removed and/or otherwise corrected with an approximated value. For example, in accordance with some embodiments of the present system, the removed values may be labelled as missing, and then corrected (e.g., replaced with an approximated value) along with the other missing values; this can also be done in a single step.

For some features f, the upper and lower bounds may be dynamic, for example for cumulative burning hours. In this case, for $o_i=(id_i,t,l,f,v_i)$, $o_{i-1}=(id_{i-1},t-1,l,f,v_{i-1})$, the process may use $f_{low}=v_{i-1}$ and $f_{up}=v_{i-1+24}$. The upper and lower bounds may also be derived based upon other observations as may be available. For example, these other observations may include information related to whether the corresponding lamp is turned on or off. One value out of the burning time, lamp on time, and lamp off time, may be verified using the remaining two values. Thus, assuming three features such as the burning time, lamp on time and lamp off time are related (e.g., burning time=lamp on time+lamp off time), if any one of these three features is determined to be incorrect or missing, the process may correct the incorrect or missing value in accordance with the other two features of the three features using any suitable method such as a learned normal behavior method, etc.

Test Results

During tests performed upon on a dataset of features F of systems operating in accordance with embodiments of the present system, it has been found that the most common errors are: (A) a decrease in energy values or burning hours (these should be non-decreasing as they are constantly accumulated); (B) power factor values below 0 or above 1; (C) mains voltage values below 0 or above a certain threshold (e.g., currently set at 600V); (D) lamp voltage above the mains voltage; and (E) current below 0.

In accordance with some embodiments of the present system, the process may employ statistical data for large existing installations (e.g., obtained from a memory of the system) to reduce noise, find and correct errors, and/or to fill (e.g., approximate and replace) missing values in the dataset of features F.

Thus, after processing the dataset of features F of the system, this dataset may be cleaned to replace data which are determined to be missing and correct data that is determined to be erroneous. The dataset of features F after processing (e.g., for cleaning, etc.) may be referred to as a processed dataset of features F and may be referred to as a transport ready dataset which may be transmitted as transport information (TI). Thus, the TI may include the transport ready dataset and, thus, the processed (e.g., cleaned) dataset of features F.

In accordance with some embodiments, the transport ready dataset may exclude erroneous data, may include approximated data to replace missing data, and/or may include other approximated data to substitute for data determined to be erroneous and/or missing. Further, the TI may include an arithmetic consolidation of multiple raw data elements (e.g., as may be included in the LLD) with the same time stamp.

However, in yet other embodiments, the TI may include only selected time stamps for a given raw data feed (e.g., as provided by the LLD). Moreover, in yet other embodiments the TI may be constantly updated based upon processing and storage resource availability in a portion of the controller such as a server of the system. In yet other embodiments the TI may include information which may be required to meet performance thresholds (e.g., as may be set forth in a service level agreement of a maintenance contract).

After completing act 209, the process may continue to act 211.

During act 211, the process may transmit the processed (e.g. cleaned) dataset of features F to any suitable memory of the system, such as an outdoor lighting database 213, for storage. For example, in accordance with some embodiments, the process may obtain the processed dataset of features F and may transmit the dataset of features F to the outdoor lighting database 213 for storage. This outdoor lighting database 213 may form part of a backend system for performing one or more processes or portions thereof to analyze and/or control portions of the present system. Thus, once, the dataset of features F is processed (e.g., cleaned and grouped per time t (i.e., per night)), it is transmitted to a backend system for storage. After completing act 211, the process may continue to act 217.

During act 217, the process may perform a cleaning process upon the stored dataset of features F which may be obtained from a memory of the system such as the outdoor lighting database 213. The cleaning process may be based upon information such as past data, public data, relations between features, and learned normal behavior. This act may be performed if it is determined that the information available and/or the processing power available to the act 209 are insufficient to ensure data with a desired accuracy. Accordingly, the process may form a corresponding cleaned processed dataset of features F. After completing act 217, the process may continue to act 219.

During act 219, the process may determine informative data features using any suitable method. For example, the informative data features may be determined by performing a complex feature extraction process to derive complex features (CFs) which form the informative data features. The informative data features may be used to by the process to determine future operating performance of the lighting system being analyzed such as component failures which may include lamp failures and may include corresponding complex features. For example, the informative data features may predict lighting system component failures such as lamp failures. During this act, the process may compute or otherwise determine the informative data features using any suitable method. For example, the informative data features may be represented by the function:

$$\Psi : X \times L \rightarrow \Re^m, \qquad \text{Eq. (11)}$$

which may be processed to compute one or more informative data features as a function of one or more lamp pole parameters (LPPs) (e.g., see, Eq. (12)), and one or more features (f) of the full input data set X. Thus, if A is defined as the set of informative data features determined based upon X and L, A may be defined as:

$$A = \Psi(X, L). \qquad \text{Eq. (12)}$$

The process may use Eqs. 11 and 12 to compute a data set D which may include the full input data set X and the informative data features A, where D may be defined as:

$$D = X \cup A. \qquad \text{Eq. (13)}$$

Assuming for each lamp pole $l_n$ there are a number of variables (e.g., lamp pole parameters (LPPs)) that define a type and a (geophysical) location of the lamp pole $l_n$ relative to the lighting system. Then, a lamp pole $l_n$ may be defined mathematically as:

$$l = (l_{id}, l_{type}, l_{OLC}, l_{loc}, l_{pow}, l_{pow\_cor}, l_{inst}, l_{life}, l_{brand}, l_x, l_y, \ldots), \qquad \text{Eq. (14)}$$

where $l_{id}$ denotes the lamp identification (ID), $l_{type}$ the lamp type, $l_{OLC}$ the outdoor lighting controller (OLC) type, $l_{loc}$ the location type, $l_{pow}$ the power, $l_{pow\_cor}$ the power correction, $l_{inst}$ the install date (e.g., installation date), $l_{life}$ the lifetime, $l_{brand}$ the brand, $l_x$ the latitude and $l_y$ the longitude of the lamp. With regard to the location type, this variable defines a method used to define the geophysical location of the corresponding lamp pole. For example, in some embodiments the location type may include GPS location information. However, in yet other embodiments the location type may be of a grid type (e.g., using a row and column form). However, in yet other embodiments it is envisioned that the location type may define a location using a descriptive value such as a city center, a country side, a beach, open space, a stadium, urban side streets, urban highways, suburban highways, rural highways, parking lot, urban area, suburban area, etc. as may be defined by the location in which the lighting system or parts thereof such as the lamps are installed such as is shown in Table 1 below (e.g., see, location type). The variables shown in Eq. (14) (e.g., $l_{id}$, $l_{type}$, $l_{OLC}$, $l_{loc}$, $l_{pow}$, $l_{pow\_cor}$, $l_{inst}$, $l_{life}$, $l_{brand}$, $l_x$, and/or $l_y$ may be defined by the system and/or user. Some possible values for the different parameters are defined in Table 1 be low.

TABLE 1

| Variable | Options |
|---|---|
| Lamp type | Light emitting diode (LED), sodium-vapor (SON), Metal-Halide (MH), fluorescent, filament, etc. |
| OLC type. | 7020, etc. |
| Location | GPS location |
| Location type (e.g., located at) | beach, inland, town, city center, country, etc. |
| Power and power correction | 72 and 14.4. |
| Install date | 2010-03-25 15:27:34 |
| Lifetime | 14400 hours |
| Brand | Master CityWhite ™ CDO-xT 70 W - dim 1-10 V |

With regard to L, if L is set to be the set of all nL lamp poles of the lighting system, L may be defined as:

$$L=\{l_1, \ldots, l_{nL}\}. \quad \text{Eq. (15)}$$

Then, given the full input data set X and the lamp pole parameters L, the process may determine the informative data features. The informative data features determined by the process can be more informative than standard data such as actual hours (e.g., 800 hrs.) and lifetime hours (e.g., 950 hrs.) when used to predict future lighting system performance.

In accordance with some embodiments, the process may determine the following informative data features which may be used to predict end-of-life of a lamp as shown in Table 2 below. It will be assumed that the informative data features may be determined when the lighting system is configured and information related thereto may be stored in a memory of the system for later use. However, in yet other embodiments, it is envisioned that the informative data features may be determined temporally (e.g., periodically, non-periodically, at a request of a user, etc.).

TABLE 2

INFORMATIVE DATA FEATURES

| Description | Acts Performed by Process to Derive Complex Feature |
|---|---|
| Prior to the end of life, the voltage of some lamps sharply increase. Accordingly, the process may record the voltage of a lamp over time. To discover this phenomenon, the process may fit a polynomial of degree 2 (e.g., $(c_0 + c_1 x + c_2 x^2)$) to the voltage feature (e.g., voltage of lamp over time), and use the value of $c_2$ as a new complex derived feature, named the 'quadratic voltage trend'. | determine a quadratic voltage trend by, for example, fitting a polynomial of degree 2 (e.g., $(c_0 + c_1 x + c_2 x^2)$) to the lamp voltage feature and using the value of $c_2$ as a complex feature, named the 'quadratic voltage trend' |
| The failure of some lamps can be predicted by determining the relative difference between the electronics temperature and the ambient temperature. The weather data can be linked to individual lamp by using the GPS coordinate of the weather stations and lamp poles to link each lamp to the nearest weather station. This leads to the complex feature: (ambient temperature − electronics temperature)/ambient temperature. | determining (ambient temperature − electronics temperature)/ambient temperature |
| For some lamps, as they wear out, it becomes more difficult to ignite. As a result several attempts may be required. The process may measure this phenomenon by recording the number of times the lamp attempts to ignite before another instruction is given, or in a predetermined time period. The overall total number of ignition attempts the lamp has made during its lifetime is also recorded. Similar to voltage example, given above, also here the process may determine the quadratic trend in the number of ignition attempts. | Counting the number of ignition attempts in the defined interval (C1) Counting the number of ignition attempts of the lamp during its lifetime (C2) fitting a polynomial of degree 2 (e.g., $(c_0 + c_1 x + c_2 x^2)$) to C1 and using the value of $c_2$ as a complex feature, named the 'quadratic ignition attempt trend' fitting a polynomial of degree 2 (e.g., $(c_0 + c_1 x + c_2 x^2)$) to C2 and using the value of $c_2$ as a complex feature, named the 'lifetime quadratic ignition attempt trend' |
| For some lamps, as they wear out, the lamp more often spontaneously extinguishes. The process may record the number of times this occurs, both upon ignition and upon a dimming action. Similarly to ignition attempts, the process may determine the total number of extinguishes in the lamps lifetime, in the predefined interval, and the quadratic trend in both. | fitting a polynomial of degree 2 (e.g., $(c_0 + c_1 x + c_2 x^2)$) to the data corresponding to the recorded number of times the lamp spontaneously extinguishes and using the value of $c_2$ as a complex feature, named the 'quadratic ignition attempt trend' |
| The amount of energy used per day is more informative than the total amount of energy used so far (e.g., over the total life of the bulb), which is the standard parameter to record. | determining total amount of energy used per day (or per time period (other than total amount of energy used by the bulb from the start of its life). |

TABLE 2-continued

INFORMATIVE DATA FEATURES

| Description | Acts Performed by Process to Derive Complex Feature |
|---|---|
| The difference and delay between the dimming command and the dimming result. | determining difference and/or delay between the dimming command and the dimming result |
| The total number of dimming level changes so far. | determining total number of dimming level changes |
| Total burning hours of a lamp so far divided by the statistically expected lifetime at which x % of the lamps fails. Typical values of x are 50%, 5%, 10%, and 20%. | determine total burning hours of a lamp so far divided by the statistically expected lifetime at which x % of the lamps fails |
| Some lamps need time to warm-up before they can be dimmed. The duration of this warm up period depends on the specific lamp version used. The process may record the duration of the warm-up and use this information (e.g., information indicating warm-up periods--which is a static value per lamp version) to normalize the duration time from when the lamp turns on to the time of the first dimming action. This normalized duration is informative for predicting future failures, where the original value is not. | determine the duration of the warm-up and use this information (e.g., information indicating warm-up periods--which is a static value per lamp version) to normalize the duration time from when the lamp turns on to the time of the first dimming action. |

In yet other embodiments, the process may determine informative data features such as those listed in Table 3 below. For example, in accordance with some embodiments, the process may determine a quadratic voltage trend of the lamp (e.g., over time, at specific points in time).

TABLE 3

INFORMATIVE DATA FEATURES
FOR CORRESPONDING LAMPS a quadratic voltage trend of the lamp (e.g., over time, at specific points in time)
a the relative difference of determined internal and ambient temperatures
a determined number of ignition attempts and its quadratic trend
a determined number of spontaneous lamp extinguish events upon ignition and upon dimming and its quadratic trend
a determined difference and delay between dimming commands and results, and the cumulative number of dimming actions
a determined relative delay from ignition to first dimming request compared to the static lamp dependent warm-up period
a determined number of total operating hours relative to the expected lifetime of the component (such as the lamp)
the energy usage per day (e.g., of a lamp)

In accordance with yet other embodiments, the informative data features may be constantly updated based on processing and storage resource availability in the main server. The informative data features are most useful for predicting upcoming failures, hence, if storage availability is limited, only these features are stored, and the full input set X is removed from storage once the informative features are computed. Additionally, the informative features and/or the input set X can be ranked according to importance for later use. Depending on the storage availability, the highest ranking features are stored first. If the processing availability is limited, the computation of the informative features is performed according to their ranking. If the processing is only temporarily limited, the computations can be delayed.

In yet other embodiments, the informative data features may include both necessary and sufficient data for maintaining the service level agreement outlined in the maintenance contract.

In accordance with some embodiments, the service level agreement may include at least one parameter for measuring performance and may be represented as a list. For example, these parameter(s) may be included in the list of informative features. Further, the informative data features may be those features used by the maintenance provider to execute the service (i.e., plan, and carry out the maintenance). Moreover, additional informative data features as discussed hereafter may be included in the list needed to uphold the service level agreement.

Many more additional informative data features may be determined by the process in accordance with the function $\Psi: X \times L \rightarrow \Re^m$ that may be the process to compute a new complex features as a function of one or more lamp parameters (e.g., L) and one of more data features (e.g., X) as discussed above. Then, informative data features A may be calculated and/or dataset D may be defined as discussed above and may be stored in a memory of the system such as the outdoor lighting database 213 for later use. Thus, the informative data features may form lighting prediction data which includes the determined complex features. These complex features may be based, at least in part, upon the lamp electrical information, the system operating information, the sensor information, the installation configuration information, the weather information, the traffic information and the crime information. The outdoor lighting prediction data may include information which predicts lighting system component failures such as predicted lamp failures at a future date.

After completing act 219, the process may continue to act 221.

During act 221, the process may determine variable importance of the dataset D. The process may determine most important features (e.g., in the dataset of D) using any suitable statistical method such as a Random Forest method. Before determining the most important features f, it is important to select a feature DP that needs to be explained or predicted from the data. Thus, $D^P$ may be one element of D, i.e. one feature that is the target of the prediction.

For example, a Boolean value indicating if for a certain lamp, a failure of a particular type has occurred during a selected period. Let var be the number of variables in $D^H = D \backslash D^P$. $D^P$ can be real-valued data, categorical, Boolean, or integer data. In case the data (e.g., $D^P$) is Boolean or integer, it can also be considered as categorical. In case the data $D^P$ is categorical, the process may denote each unique value in $D^P$ as a separate class. Let the set of classes be given by:

$$C = \{c_1, \ldots, c_{nC}\} \qquad \text{Eq. (16)}$$

Although the Random Forest can also be used to predict real-valued data, reference will be made to predicting the class for the sake of clarity. However, it should be understood that the RF may also be extended to predict real-values data.

Generally, a Random Forest RF consists of N trees:

$$RF = \{TR_1, \ldots, TR_N\}, \qquad \text{Eq. (17)}$$

wherein, each tree $TR_i$ starts with a root node $\eta_0$ containing all input data, i.e. $\eta_0 = D^H$, and subsequently splits a node $\eta_i = D_i^H$ along one of the features in the dataset into 2 smaller nodes $\eta_{j_1} = D_{j_1}^H$ and $\eta_{j_2} = D_{j_2}^H$ with $D_i^H = \eta_i = \eta_{j_1} \cup \eta_{j_2} = D_{j_1}^H \cup D_{j_2}^H$. When a corresponding node is determined to contain only data belonging to a single class, the node is no longer split, and is called a leaf node. Hence a tree is formed by a collection of nodes:

$$TR_i = \{\eta_0, \eta_1, \ldots, \eta_q\}. \qquad \text{Eq. (18)}$$

Then, let $s(\eta_i)$ denote the size of node $\eta_i$, i.e.:

$$s(\eta_i) = |D_i^H|. \qquad \text{Eq. (19)}$$

The prediction of a node $\gamma(\eta_i)$ is given by the class that is determined to occur most in its dataset:

$$\gamma(\eta_i) = \arg\max_{c \in C} |\{c = D_i^P(y) \mid y \in D_i^H\}|. \qquad \text{Eq. (20)}$$

Then, to predict the class of some data point y, the data point y is put down each of the N trees to the leaf nodes, returning the leaf node's prediction for each tree which results in N classifications for y. Let function $\chi$ give the prediction of a tree for data point y, i.e.:

$$\chi: RF \times \Re^{var} \to C. \qquad \text{Eq. (21)}$$

Furthermore, letting the set of class predictions of forest RF for data point y be given by:

$$\Lambda(y) = \{\chi(RF_1, y), \ldots, \chi(RF_N, y)\}, \qquad \text{Eq. (22)}$$

the probability that data point y belongs to class c is given by:

$$Pr(c, y) = \frac{1}{N} |\{\Lambda(y) = c\}|, \qquad \text{Eq. (23)}$$

then, the forest chooses that classification c(y) having the highest probability, i.e. the most votes:

$$c(y) = \max(\{Pr(c, y) | c \in C\}). \qquad \text{Eq. (24)}$$

In order to create the Random Forest, each tree is created starting from a bootstrap sample of the input data $D^H$ of same size as the original data $D^H$. The bootstrap sample is created by repeatedly randomly choosing one data point y from the input data $D^H$. Hence each tree is created from a different bootstrap sample. Let the bootstrap sample used to create the $i^{th}$ tree be given by $B_i$. Then:

$$B_i \subset D^H, \qquad \text{Eq. (25)}$$

And, the total set of bootstrap samples to create the forest can be given by:

$$B = \{B_1, \ldots, B_N\}. \qquad \text{Eq. (26)}$$

In order to create the tree, in the standard method, at each node, K of the variables are selected at random (e.g., by the process) and only these variables are searched through for the best split. For example, the process may select:

$$K = \sqrt{var}. \qquad \text{Eq. (27)}$$

However, from test results the outdoor lighting systems, it has been determined that considerable differences exist in failure behavior of lamps located near beaches and lamps located inland. In particular, it has been determined that for beach locations the weather data is more important for failure prediction then for inland locations. Hence for failure prediction we use a probability distribution function (pdf) with higher weight for weather data in case of beach lamps compared to inland lamps. As a result, this means that the process may not select K of the variables uniformly (i.e., fully at random), but according to a probability vector v. To determine the probability vector v, the process may use a normalized version of the variable importance measure(s), which are discussed below. The variable importance measure(s) then need to be normalized such that each element of the probability is between 0 and 1, and all elements add up to 1.

The process may then determine a best split, to determine the best split, the process may use gini impurity which may be defined as:

$$g(\eta) = 1 - \sum_{i \in C} p_i^2, \qquad \text{Eq. (28)}$$

where $p_i$ is a proportion of data points in the node $\eta$ from class i.

It (e.g., the gini) measures how often a randomly chosen element from the set would be incorrectly labeled if the randomly chosen element were randomly labeled according to the distribution of labels in the subset. For a node with all data points in a single class, the gini impurity is equal to 0, where for a node with equal amounts of data points in two classes, the gini impurity is equal to 0.5.

It has been found that best split of a node into 2 children $\eta_1$ and $\eta_2$ is a split which results in the lowest gini impurity value, i.e.:

$$\arg\min g(n_1) + g(n_2), \qquad \text{Eq. (29)}$$

The decrease $\Delta(i)$ in gini impurity of node $\eta$ due to the best split into $\eta_1$ and $\eta_2$ according to variable i is equal to:

$$\Delta(i) = \begin{cases} g(\eta) - g(\eta_1) - g(\eta_2) & \text{if split is due to } i \\ 0 & \text{otherwise} \end{cases}. \qquad \text{Eq. (30)}$$

The margin M of a data point y is the proportion of votes for the true class minus the maximum proportion of votes for the other classes, i.e.:

$$M(y) = Pr(y, D^P(y)) - \max\{Pr(y, c) | c \neq D^P(y)\}. \qquad \text{Eq. (31)}$$

The size of the margin M gives a measure of how confident the classification is. In the present embodiment, assuming only two classes and true class c, this gives:

$$M(y) = \qquad \text{Eq. (32)}$$

$$\frac{Pr(y, D^P(y))}{N} - \left(1 - \frac{Pr(y, D^P(y))}{N}\right) = \frac{2 Pr(y, D^P(y))}{N} - 1.$$

The Random Forest supplies four measures that can be used to determine which variables are most important for the prediction. In order to define these measures, we first introduce some additional definitions.

Let function $\Pi: \Re^n \to \Re^n$ randomly permute the input values $D^H$, i.e., the ordering of the values is altered randomly. Let $D^H(i)$ denote the $i^{th}$ variable of $D^H$. A random permutation of the values of the $i^{th}$ variable of $D^H$ is then given by $\Pi(D^H(i))$. Furthermore, define:

$$\tilde{D}^H(i) = \{D^H(1), \ldots, D^H(i-1), \Pi(D^H(i)), D^H(i+1), \ldots, D^H(\text{var})\}. \quad \text{Eq. (33)}$$

Let $\tilde{y}(i) \in \tilde{D}^H(i)$ denote the matching data point of $y \in D^H$ with the $i^{th}$ variable permuted. The individual tree classifications are then given by:

$$\tilde{\Lambda}^T(y,i) = \{\chi(RF_j, \tilde{y}(i)) | \gamma \notin B_j, j=1, \ldots, N\}, \quad \text{Eq. (34)}$$

the class probabilities by:

$$\tilde{P}r^T(c, y, i) = \frac{|\{\tilde{\Lambda}^T(y, i) = c\}|}{|\tilde{\Lambda}^T(y, i)|}, \quad \text{Eq. (35)}$$

and the final classification can be given by:

$$\tilde{c}^T(y,i) = \max\{\tilde{P}r^T(c,y,i) | c \in C\}. \quad \text{Eq. (36)}$$

The resulting test error then becomes:

$$\tilde{E}(i) = \frac{|\{\tilde{c}^T(y, i) \neq D^P(y) | y \in D^H\}|}{|D^H|}, \quad \text{Eq. (37)}$$

and the margin turns to:

$$\tilde{M}^T(y,i) = \tilde{P}r^T(y, D^P(y), i) - \max\{\tilde{P}r^T(y,c,i) | c \neq D^P(y)\}. \quad \text{Eq. (38)}$$

Four tests measures 1 through 4 ($M_1$ through $M_4$, respectively) will now be defined and will be used to determine variable importance for respective tests.

Measure 1. In the left out data points for the $k^{th}$ tree, randomly permute all values of the $i^{th}$ variable, classify these new data points, and determine a new test set error rate. The amount by which this new test set error exceeds the original test set error is defined as the importance of the $i^{th}$ variable. Formally, this measure may be defined as:

$$M_1(i) = \tilde{E}(i) - E. \quad \text{Eq. (39)}$$

Measure 2. The average lowering of the margin across all data points when the $i^{th}$ variable is randomly permuted for the data points left out for the $k^{th}$ tree. Formally this measure may be defined as:

$$M_2(i) = \frac{1}{|D^H|} \sum_{y \in D^H} \{M(y) - \tilde{M}(y, i)\}. \quad \text{Eq. (40)}$$

Measure 3. How many margins are lowered minus the number of margins raised when the $i^{th}$ variable is randomly permuted for the data points left out for the $k^{th}$ tree:

$$M_3(i) = |\{M(y) > \tilde{M}(y,i) | y \in D^H\}| - |\{M(y) < \tilde{M}(y,i) | y \in D^H\}|. \quad \text{Eq. (41)}$$

Measure 4. At every split, one of the Ktry variables is used to form the split, and there is a resulting decrease in the gini value. The sum of all decreases in the forest due to a given variable, normalized by the number of trees, forms measure 4, i.e., $$M_4(i) = \frac{1}{N} \sum \Delta(i). \quad \text{Eq. (42)}$$

For the problem of predicting failures, typically, the number of failures (e.g., class 1) compared to non-failures (e.g., class 0) is very small. This is called an unbalanced prediction problem. Because the classes are unbalanced (i.e., the number of elements from one class is much larger than that of another class), random permutation of the data can lead to misleading outcomes. For example, when there are only 10 instances of class 1 and 90 instances of class 2, then randomly permuting the data gives on average 90%*90=81 instances of class 2 that are still in class 2, and 9 instances have changed to class 1. For the old class 1, 9 instances will on average become class 2, while only a single instance remains class 1. Hence, classifying the new data of class 2 may only reduce a bit (10%) in accuracy, where the accuracy for the new data of class 1 may reduce by 90%. Because the first 3 measures (e.g., $M_1$ through $M_3$) each suffer from this problem, reference will be made to measure 4 (e.g., $M_4$).

Although measure 4 ($M_4$) does not suffer from this problem, the used proportions are either large or small for unbalanced problems (e.g., for an unbalanced problem the proportion of data for one class is small, so it is large for the other class, by definition), already at the root of the tree. For the root in the given example, the process may obtain a root such as $g(\text{root}) = 1 - 0.9^2 - 0.1^2 = 1 - 0.81 - 0.01 = 0.18$ (e.g., for a single-node tree). Then, if the root is split into 2 nodes (e.g., for a two-node tree), where node1 has 9 instances of class 1, and 8 instances of class 2, and node2 has 1 instance of class 1 and 82 instances of class 2. Then, $$g(node1) = 1 - \frac{9^2}{17} - \frac{8^2}{17} = 0.4983 \text{ and}$$

$$g(node2) = 1 - \frac{1^2}{83} - \frac{82^2}{83} = 0.0238.$$

Since the goal is to minimize the sum of the two gini values, i.e. 0.0238+0.4983=0.5221, this split is considered as a deterioration. This can be determined by the change in the gini value which, in the current example, is 0.18−0.4983−0.0238=−0.3421, i.e. smaller than 0. Actually, this tree would result in predicting class 2 in node 2, which leads to only 1 instance where a data point for class 1 is predicted as class 2. For node 1, it would result in predicting class 1, resulting in 8 instances wrongly predicted as class 1. In total, there are 9 wrong predictions, where the root node predicts all data as class 2, i.e. 10 wrong predictions. Accordingly, when sensitivity and specificity of this tree (e.g., the two-node tree) are compared relative to the previous tree (e.g., the single-node tree), it can be determined that the accuracy has improved only a little from 90% to 91%, and the sensitivity decreased from 100% to 92%, the specificity improved dramatically from 0% to 90%. Hence, whereas the tree consisting only of the root node (e.g., the single-node tree) is essentially useless, the new tree (e.g., the two-node tree) has good quality.

Hence, a new criterion will be defined for selecting the best split, as well as a new criterion for selecting the most-important features as will be described below.

Selecting Best Split and Most-Important Features

Let $w_i$ denote the fraction of data points of class i in the dataset $D^H$. In the present example, from the data $D^p w_1=0.1$ and $w_2=0.9$. Letting $$q_i = \frac{p_i}{w_i},$$

then:

$$g^{NEW}(\eta) = 1 - \sum_{i \in C} \left( \frac{q_i}{\sum_{i \in C} q_i} \right)^2, \quad \text{Eq. (43)}$$

Then, solving for $g^{NEW}$ using Eq. (43) in accordance with embodiments of the present example, leads to the following results for g(root), g(node1), g(node2).

$$g(\text{root}) = 1 - (1/2)^2 - (1/2)^2 = 0.5,$$

$$g(node1) = 1 - \left( \frac{\frac{9}{17}}{\frac{0.1}{\frac{9}{17}} + \frac{8}{17}} \right)^2 - \left( \frac{\frac{8}{17}}{\frac{0.9}{\frac{9}{17}} + \frac{8}{17}} \right)^2 = 0.1620, \text{ and}$$

$$g(node2) = 1 - \left( \frac{\frac{1}{83}}{\frac{0.1}{\frac{1}{83}} + \frac{82}{83}} \right)^2 - \left( \frac{\frac{82}{83}}{\frac{0.9}{\frac{1}{83}} + \frac{82}{83}} \right)^2 = 0.1782.$$

Using this new method (e.g., as defined by Eq. (43)), the gini value decreases from 0.5 to 0.1620+0.1782=0.3402. The variable importance measure ($M_5$) (e.g., variable importance) now becomes:

$$M_5(i) = \frac{1}{N} \sum \Delta^{NEW}(i), \quad \text{Eq. (44)}$$

where $\Delta^{NEW}(i) =$ $$\begin{cases} g^{NEW}(\eta) - g^{NEW}(\eta_1) - g^{NEW}(\eta_2) & \text{if split is due to } i \\ 0 & \text{otherwise} \end{cases},$$

Accordingly, during act 221, the process may determine variable importance using at least one of the equations set forth above such as with Eq. (44) and in accordance with the input data D. The variable importance may then be determined for each complex feature determined defined during act 219. After completing act 221, the process may continue to act 223.

During act 223, the process may select (one or more) variables having the most importance. Accordingly, the process may compare each of the variable importance values and determine the largest variable importance values using any suitable method and then select corresponding complex feature(s). For example, in some embodiments, the process may select the only a selected number (e.g., 2, etc.) of the largest variable importance values, where the selected number may be an integer and may be selected by the user and/or system. For example, in some embodiments, the process may select the two largest variable importance values and the associated informative data features. However, in yet other embodiments, the process may compare each of the variable importance values with corresponding threshold values and determine and select only variable importance values which are determined to be greater than or equal to the corresponding threshold values. Thus, for example, in some embodiments, the process may select variable importance values which are greater than 0.2, etc.

Test Results

Figure 3A:
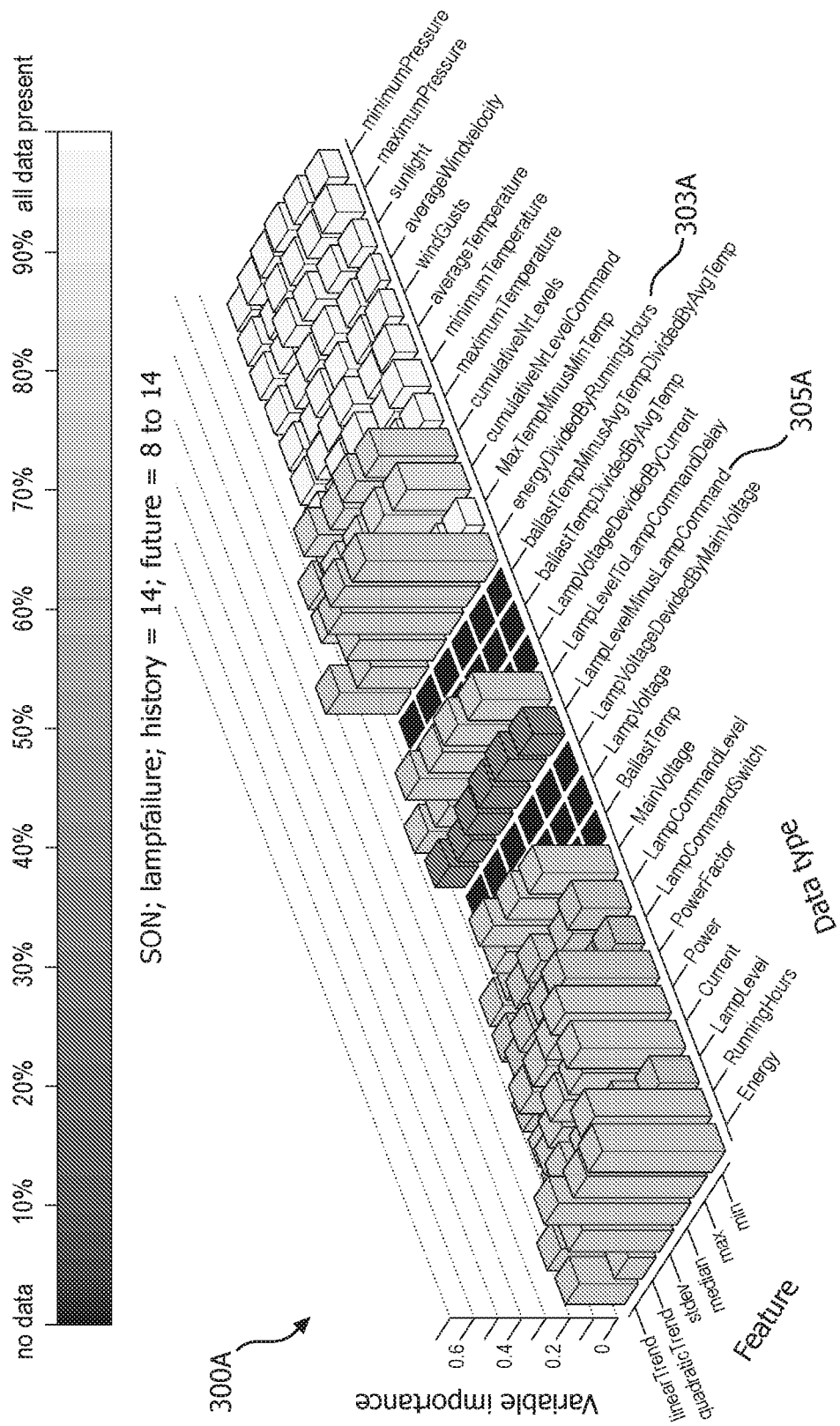
FIG. 3A shows a graph illustrating an output of test results for determining variable importance for a SON lamp in accordance with embodiments of the present system.
Figure 3B:
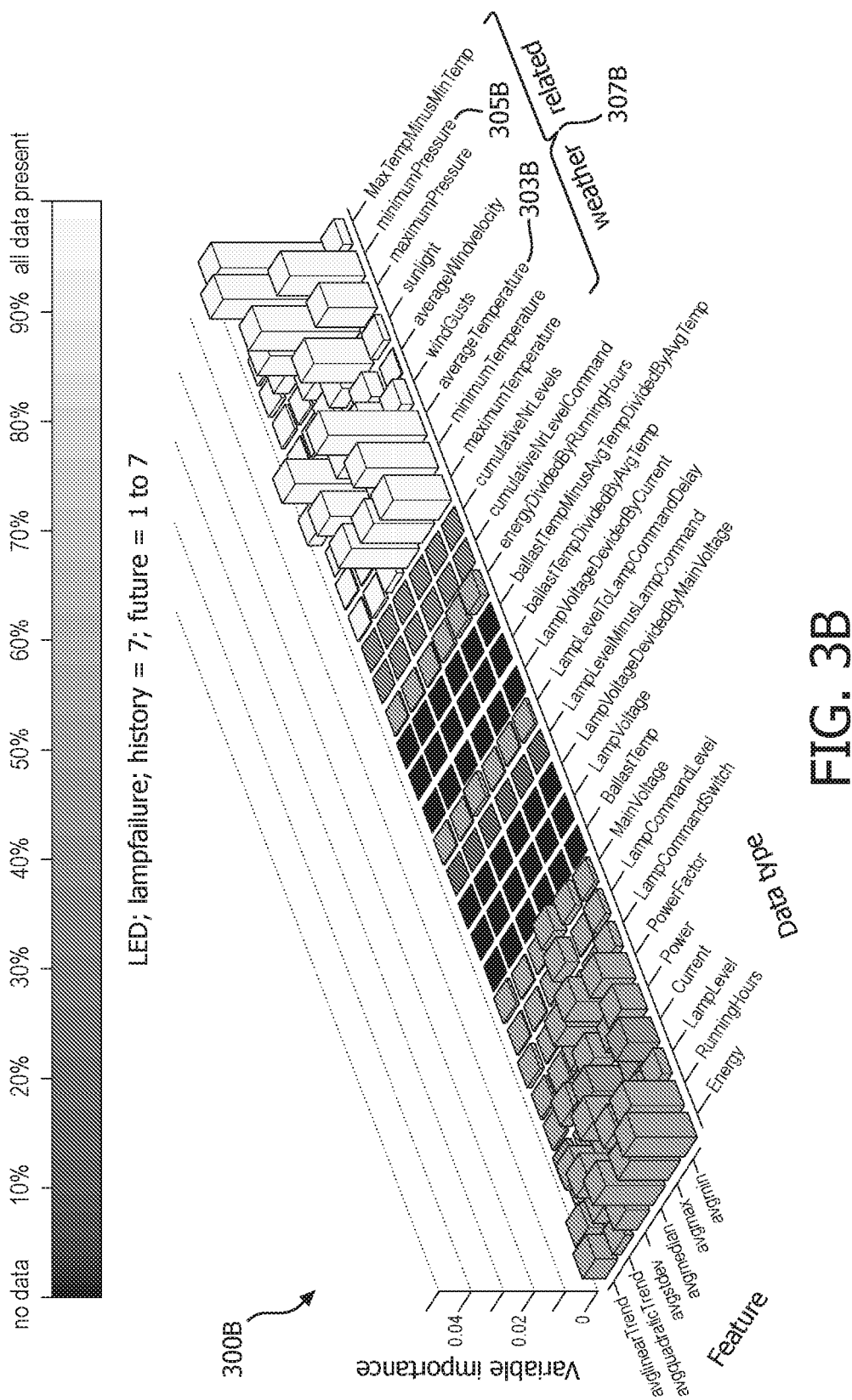
FIG. 3B shows a graph illustrating an output of test results for determining variable importance for a LED lamp in accordance with embodiments of the present system.

FIG. 3A shows a graph 300A illustrating an output of test results for determining variable importance for a SON lamp in accordance with embodiments of the present system; and FIG. 3B shows a graph 300B illustrating an output of test results for determining variable importance for a LED lamp in accordance with embodiments of the present system. Graphs 300A and 300B show variable importance as a function of (e.g., complex features determined during act 219) feature. The complex features in graphs 300A and 300B are represented using a 3-dimensional bar graph for the sake of clarity. However, in yet other embodiments, the complex features may be placed on the same axis, if desired. Graphs 300A and 300B should be read as follows: on 'data type' axis it states e.g. 'Energy', on the 'feature' axis it states e.g. 'linear trend', these two labels together form the name of the complex feature 'linear trend in Energy', with the associated variable importance on the vertical axis.

For example, with regard to the SON lamp, graph 300A illustrates that the most important complex features are energy and running hours (e.g., "energyDividedByrunningHours" 303A and the delay between lamp dimming commands and their execution (e.g., "LampLevelToLampCommandDelay") 305A, while for LED lamp failures, the most important features are average temperature ("averageTemperature") 303B and minimum pressure ("minimumPressure") 305B. However, with respect to graph 303B, it is seen that the most important features are generally weather related as illustrated by bracket 307B. In some embodiments, the data type information may be arranged in order in a predetermined order. For example, weather-related data types may be grouped together. For example, it is envisioned that other groups may include configuration related groups, lamp switching/dimming schedule related groups, crime related groups, traffic related groups, etc. After completing act 223, the process may continue to act 225.

During act 225, the process may create a prediction model. In accordance with embodiments of the present system, the process may adapt the prediction model in accordance with maintenance planning results (e.g., maintenance scheduling). The prediction model may decide on classification as will be discussed below and will now be described in greater detail.

Prediction Accuracy Definitions Used

The main notion of accuracy that will be relevant to at least some of the present embodiments is the notion of bias which may be represented as B. Consider a lamp with T representing the failure time (a random quantity whose mean value is denoted by E[T]). Embodiments of the process may utilize a computational procedure to predict the failure time T, and the corresponding predicted value is $T_{pred}$. The process may then define the bias B to be:

$$B = E[T] - T_{pred}. \quad \text{Eq. (45)}$$

If the bias B is positive, it indicates that the lamp is predicted to fail sooner than expected, whereas if the bias B is negative, the lamp is predicted to fail later than expected. In other words, the expected life of the lamp may be overestimated.

Maintenance Planning Algorithm and Performance Results

The process may take into account one or more costs associated with maintenance of the lamps in the lighting system in accordance with embodiments of the present system such as illustrated in Table 4 below.

TABLE 4

Cost Table for Lamp Replacement

Lamp Installation Cost: this is related to the cost of installing new lamps in the lighting system.
Wasted Lamp Life Cost due to early replacement: if a lamp is replaced too early, a proportion of its life is wasted, and is considered as a cost.
User Inconvenience Cost: if the lamp is replaced too late, there is no light on the ground for some time, resulting in some cost.
Maintenance Crew Cost: the cost of placing a maintenance crew on the ground.
Fuel and Operating Costs of a Maintenance Truck, this cost may be proportional to a distance covered in each maintenance mission (event).

The problem of optimally maintaining lamps of an outdoor lighting system presents interesting complexity: the simplest maintenance algorithm wherein each lamp of the lighting system is replaced after failure may result in too large of an operating cost since many different maintenance trips will likely be required. To amortize this cost, it has been found to be advantageous to perform replacement of a collection (e.g., of a cluster) of lamps simultaneously. Since all lamps of the lighting system are unlikely to fail at the same time, this necessarily means that some lamps will be replaced too early (resulting in wasted lamp life costs), and some lamps are likely to be replaced too late (resulting in user inconvenience costs).

In accordance with embodiments of the present system, a maintenance scheduling algorithm uses the following acts to compute a maintenance schedule:
 (i) Predict failure times of lamps (possibly with some bias B) of the lighting system;
 (ii) Clustering the lamps based on the predicted failure times and geographical locations. All the lamps determined to be in a common cluster will be scheduled to be replaced in the same maintenance trip at a time that is optimal with respect to that cluster; and
 (iii) Compute an optimal route for a maintenance truck to follow to replace each of the clusters in accordance with embodiments of the present system.

The overall performance of the maintenance scheduling algorithm may depend upon the accuracy with which failure times of the lamps are predicted. Specifically, the bias B will affect the final solution. The effect of bias B on the overall cost may be simulated in accordance with embodiments of the present system. As a result of these simulations, it has been empirically determined that when the inconvenience costs of users for late replacement of a lamp are small compared to the cost of the lamp, a negative bias produces a lower overall cost, whereas when the inconvenience costs of users for late replacement of the lamp are high, a positive bias produces a lower overall cost.

The desired bias may be adapted based on the costs involved in the maintenance operation. When, for example, the inconvenience costs of users for late replacement of a lamp are small (e.g., less than a cost threshold value) compared to the cost of the lamp, a negative bias (e.g., below 0) produces a lower overall cost, whereas when the inconvenience costs of users for late replacement of the lamp are high, a positive bias (e.g., above 0) produces a lower overall cost. So in the first case (e.g., when the process determines that the inconvenience costs are small compared to the cost of the lamp), the desired bias is set to a negative value (and/or decreased from a current value) compared to normal (which is 0), and in the second case the desired bias is set to a positive value (and/or increased from a current value) compared to normal. To determine the above cases, the process may set a cost threshold value (e.g., indicative of late replacement of the lamp). Then, the process may compare the inconvenience costs with the cost threshold value. If it is determined that the inconvenience costs are less than the cost threshold value, the process may set the bias value B to be less than 0 (e.g., a negative value). In this case, the desired bias B may be decreased compared to normal (which is 0). However, if it is determined that the inconvenience costs are greater than or equal to the cost threshold value, the process may set the bias value B to be greater than 0 (e.g., a positive value). In this case, the desired bias B may be increased compare to normal. Thus, the process may determine or otherwise adjust bias B in accordance with a cost determination so as to reduce overall costs. It should be noted that the bias value B may be incrementally increased or decreased until desired results are obtained. Illustratively, for setting the magnitude for the bias value b, one can use incremental changes of a fixed magnitude set to some default value, for example, set to 1 day or 1 week. The default value typically depends on the granularity one uses in the system. Thus, for example, if the optimum maintenance schedule is determined each week, then one would typically use a default value of 1 week.

Adaptation of Model Training Based on Costs

In order to take the misclassification costs into account when creating a prediction model, an approach for a Random Forests is to adjust the class distribution in the training set. However, considering that there usually is an imbalanced data set in lighting failure prediction, this approach (e.g., the above-referenced method of adjusting the class distribution in the training set) is problematic because it causes two effects to play at the same time: the cost influence and the imbalance problem. Preferably, the cost influence and the imbalance problem are influenced one at a time. Hence, embodiments of the present system adapt a method for deciding on the classification rather than the training set or the method for splitting nodes, as the latter has been optimized to determine important variables for the lighting failure prediction problem (e.g., see, acts 221 and 223 above). Accordingly, the method for deciding on classification in accordance with embodiments of the present system will now be discussed.

First, letting a set of classes C, a random forest RF, a tree $TR_i$, α $s(\eta_i)$, and a standard prediction node $\gamma(\eta_i)$, be given as defined by Eqs. (17)-(20), respectively, above.

This prediction (e.g. the standard prediction node $\gamma(\eta_i)$) may then be adapted to take the cost of misclassification into account (e.g., as opposed to the class of some data pointy as discussed with respect to acts 221-223). Letting $\alpha_{ij}$ be the cost of classifying class i as class j, with $a_{ii}=0$, i∈C. The process may take as prediction of a node, the class that leads to the lowest cost (instead of the class with the highest probability e.g., a majority class). Then, letting $k_1$ be the number of data points of class j at node $\eta_i$, i.e. $k_j^i=|\{c=D_i^P(y)|y\in D_i^H\}|$, then, $$\tilde{\gamma}(\eta_i) = \underset{c \in C}{\arg\min} \sum_{j \in C} \alpha_{jc} k_j^i, \qquad \text{Eq. (46)}$$

Then, to predict the class of some data point y, the data point y is put down each of the N trees to the leaf nodes, returning the leaf node's prediction for each tree $\gamma(\eta_t)$, which results in N classifications for y. Let function $\chi$ give the prediction of a tree for data point y, i.e.:

$$\chi : RF \times \mathfrak{R}^{var} \to C, \quad \text{Eq. (47)}$$

Furthermore, letting the set of class predictions of forest RF for data point y be given by:

$$\Lambda(y) = \{\chi(RF_1, y), \ldots, \chi(RF_N, y)\}, \quad \text{Eq. (48)}$$

the probability that data point y belongs to class c is given by:

$$Pr(c, y) = \frac{1}{N} |\{\Lambda(y) = c\}|, \quad \text{Eq. (49)}$$

Then, the forest chooses that classification c(y) having the highest probability, i.e. the most votes:

$$c(y) = \max(\{Pr(c, y) | c \in C\}), \quad \text{Eq. (50)}$$

Then, the process may adapt this prediction to take the cost of misclassification into account. However, rather than selecting the class with the most votes, the process may select the class which leads to the least amount of costs:

$$\tilde{c}(y) = \min_{c \in C} \left( \sum_{j \in C} \alpha_{jc} |\{\Lambda(y) = j\}| \right), \quad \text{Eq. (51)}$$

Thus, by solving the above-stated equations of act 225, the process may select the class that leads to the least amount of costs. The prediction may form the prediction model and thereafter be stored by the process in a memory of the system for later use such as in a prediction model database 227.

Figure 7:
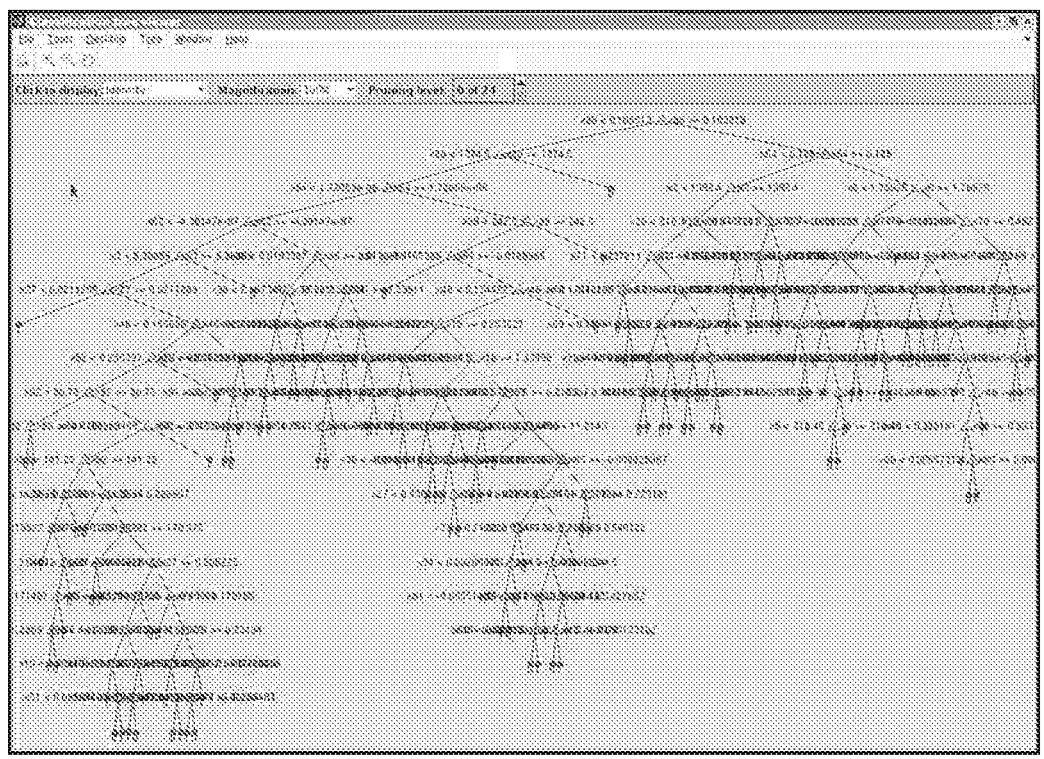
FIG. 7 shows a single tree from a random forest prediction model generated in accordance with embodiments of the present system.

FIG. 7 shows a graph 700 of a single tree of a random forest predication model generated in accordance with embodiments of the present system. The prediction model of graph 700 predicts whether lamps of a lighting system fail within four weeks in the future from the present time. The prediction may be modeled in accordance with embodiments of the present system and may be based, at least in part, in accordance with features for each corresponding lamp of the lighting system. For each lamp of a plurality of lamps of the lighting system, the random forest tree outputs a value equal to 0 if no failure is predicted or 1 if a failure is predicted, within the next four weeks.

After completing act 225, the process may continue to act 229 and/or act 239.

Referring back to act 225, during this act, in accordance with some embodiments, the process may optimize the prediction model in accordance with an optimal maintenance plan given a certain prediction accuracy. In yet other embodiments, the prediction accuracy may be defined as a bias in the prediction. In yet other embodiments, the costs of a maintenance plan may include: lamp costs, early replacement costs, late replacement costs, replacement crew costs, (replacement crew) travelling costs. In yet further embodiments, the bias of the minimum cost maintenance plan is used to optimize the prediction model. In other embodiments, the decision boundary of prediction model may be created to lead to the desired bias. In yet further embodiments, the maintenance plan and/or the desired bias may be constantly updated based on processing and storage resource availability of portions of the lighting system such as a server of the controller. In yet other embodiments, the decision boundary of the prediction model may be constantly updated based on the latest information obtained by the controller. In yet further embodiments, the prediction model may be determined such that it is sufficient to maintain the service level threshold(s) (e.g., where the threshold(s) may be set forth in an agreement outlined in the maintenance contract and stored in a memory of the system). The maintenance contract may include agreements on performance. This maintenance performance translates to the required performance of the prediction model. In accordance with embodiments of the present system, this may include the required sensitivity and specificity (see below) and/or the how long ahead in time (e.g., how far into the future) failures need to be predicted. The prediction model may be created by adapting the bias, and/or decision boundary, such that the requirements such as performance requirements may be met. Thus, for example, the prediction model may be formed by the process so that service-level thresholds are met or exceeded.

During act 229, the process may form failure predictions based upon the prediction model created during act 225. For example, the complex features which may be included in the prediction model may be computed, and fed through the created prediction model, leading to a failure prediction equal to true or false or alternatively to a failure probability, as desired. After completing act 229, the process may continue to either or both of acts 231 and 235. For example, if it is determined that a user desires to view a rendering of the failure prediction, the process may continue to act 235. However, if it is determined that a maintenance schedule is desired (e.g., a may be requested by the process and/or user), the process may continue to act 231.

During act 239, the process may improve the prediction model created during act 225. Accordingly, the process may obtain a reliability model from a reliability model database 237. The reliability models database may include for each lamp brand and type the statistical distribution of the lifetime. This information may be used to enhance the prediction model, particularly for predictions of relatively large ranges in the more distant future where the prediction model may be less accurate.

During act 231, the process may form a maintenance schedule in accordance with the failure prediction model formed during act 229. For example, the process may determine locations of all lamps of a certain cluster which are to be replaced by a certain date. Thereafter, the process may determine a route that is to be used to replace these lamps of the cluster that need to be replaced. This route may be a least-cost route (e.g., to minimize a desired variable such as time and/or distance traveled) and may set forth a route to be used for lamp replacement. To determine the route, a traveling-salesman-type method may be applied by the process. After completing act 231, the process may continue to act 233.

During act 233, the process may obtain on-site maintenance information in real time. For example, when a lamp is replaced, information of such may be transmitted (e.g., as feature information fi) to the controller of the system. Thereafter, the controller may update the features f of the lighting system to reflect the replacement. More particularly, in accordance with some embodiments, at least some features f related to configuration and/or lamp pole parameters may be updated in accordance with the replacement so as to provide proper information for later use. After completing act 233, the process may continue to act 235.

During act 235, the process may render a visualization of the system on a user interface such as a display of the system for the convenience of a user. Accordingly, the process may generate a graphical user interface (GUI) enables visualization of data related to the lighting system such as data generated by any of the determinations (e.g., calculations) of the process while maintaining a clear overview of the most important aspects at a glance, yet allowing full flexibility in case a user desires greater detail on any specific portion of the lighting system. Specifically, in accordance with some embodiments, the process may generate a GUI which, when rendered may illustrate one or more (e.g., selected or all) lamps on a desired background such as a street map, a satellite image, a street-view image, etc., depending upon system settings and/or a user selection. Further, one or more menus and/or other selections (e.g., a slider, etc.) may generated and/or provided to enable a user to, for example, scroll to a desired time or range of times such as a future time, a present time, a past time, and/or a range of times. The process may then obtain information from a memory of the system to generate a visualization of desired information corresponding to the selected time and render the visualization. The desired information may include information related to one or more portions of the system such as one or more lamps of the system that are predicted (e.g., by the process) to fail at the desired time.

Thus, for example, the process may render a graphical depiction of which illustrates when one or more lamps of the system are predicted to fail in the future in accordance with embodiments of the present system. Accordingly, the process may render a GUI which may provide an option for the user to scroll towards the future (e.g. using a slider to scroll to a selected date and/or ranges of dates) and observe when the different lamps are predicted to fail. The predictions may be determined in accordance with the failure predictions formed during act 229 and which may be obtained from the prediction model database 227. When a lamp or a group of lamps are selected, the process may generate a GUI illustrating the current status and/or future predicted status (e.g., voltage, current, power, burning hours, etc.) and the set points (e.g., usage schedules and/or the normal operating ranges) for the selected lamps or group (e.g., cluster) of lamps. For example, in some embodiments one or more features of a corresponding selected lamp or group of lamps may be obtained and/or rendered in association with the selected lamp or group of lamps.

Figure 4:
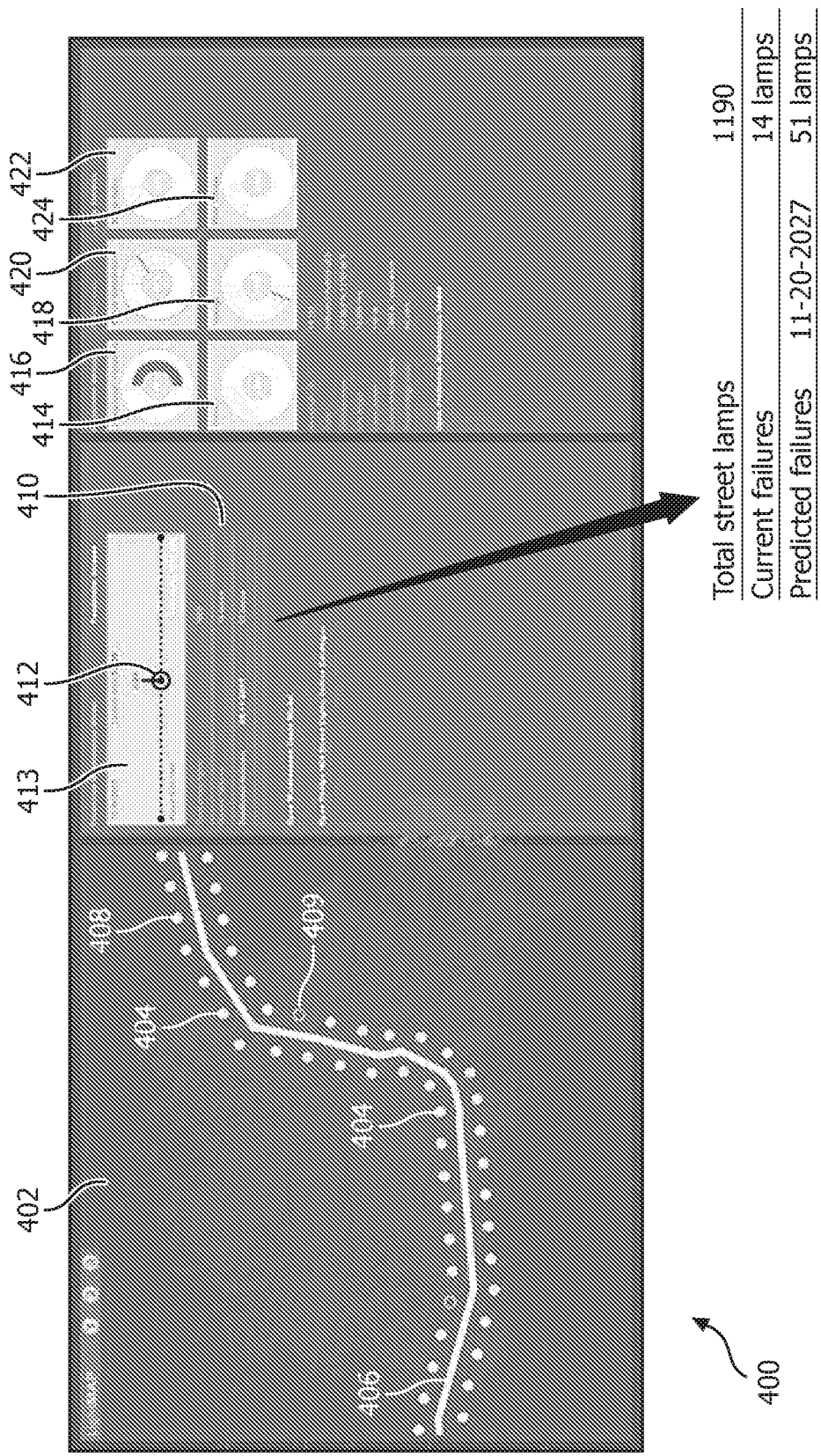
FIG. 4 shows a screenshot of a graphical user interface (GUI) formed in accordance with embodiments of the present system.

FIG. 4 shows a screenshot of a graphical user interface (GUI) 400 formed in accordance with embodiments of the present system. The GUI 400 includes information which indicates when one or more lamps of the system are predicted to fail in the future in accordance with embodiments of the present system. The GUI may include date area 413 which may include date information and a slider 412 which may be selected by the user select a date and/or range of dates. The date may be represented using a time scale. The date or range of dates may include past, present, and/or future dates or range of dates. For example, in the present embodiment it will be assumed that the selected date is a user has selected date in the future such as Feb. 2, 2020. The GUI 400 may include a map 402 which may include a depiction of one or more portions of the lighting system such as all installed lamps 404 of the system that lie along a street 406 which is within a displayed portion of the map 402. The process may obtain information related to predicted (cumulative) lamp failures on the selected date and may render this information using any suitable method such as using open circles 409 which indicate lamps which are predicted to have failed on the selected date. Similarly, lamps 404 which are predicted to be functioning on the selected date may be illustrated using solid circles 408. Further, the GUI 400 may be configured such that the user can zoom in and or out to view larger and/or smaller portions of the map 402, respectively, if desired. Accordingly, for example, when a viewer zooms out of the map 402 more lamps 404 of the lighting system may be displayed. As the predicted lamp failures may be cumulative, they may increase as the user selects a date in the further future. However, in yet other embodiments the predicted lamp failures may be illustrated for only lamps which fail on the selected date.

The slider 412 may be generated by the system and may enable the user to observe a predicted state of the lighting system on the selected date. As the user sets the selected date further into the future, the number of lamps that are predicted to fail will increase and an increasing number of lamps that have failed 409 will be illustrated. Accordingly, a user may determine when a lamp is predicted to fail and adjust maintenance and/or replacement efforts based on this information. The GUI may further include information related to the lighting system 410 such as one or more of a total number of lamps, current number of lamp failures (on the current date), a predicted number of lamp failures by the selected date (e.g., Nov. 20, 2027), a link to information about new systems and lamps, and the projected costs of replacement.

When the user selects a lamp 404 or group of lamps on the map 402, the process may render key parameters related to the selected lamps such as: the actual and requested dimming status 416, the burning hours, the lamp voltage 418, current 414 and power factor 422, and the mains voltage 424, ballast temperature 420. The process may further determine average value of parameters for all of the selected lamps. For example, an average value of current used by each of the lamps of the group (determined over the whole group) may be determined and rendered on a display of system for the convenience of a user. The process may do this for selected values, such as the actual and requested dimming status 416, the burning hours, the lamp voltage 418, current 414 and power factor 422, and the mains voltage 424, ballast temperature 420, etc.

It is also determined that the process may further generate a GUI to include a graphical depiction of at least one of actual and requested dimming status, burning hours, lamp voltage, current, power, mains voltage, and average levels (e.g., average values for the actual and requested dimming status, burning hours, lamp voltage, current, power, mains voltage) for a group of lamps (comprising one or more lamps) which are selected by the user or system of the plurality of lamps. The process may then highlight lamps whose average for a corresponding value is above or below the corresponding average value for the group of lamps, if desired.

For at least one parameter, a quality measure may be determined and rendered. For example, a large difference between the requested and actual dimming status is a low quality sign. Accordingly, this may be illustrated using a corresponding color such as a red highlight. For burning hours, the current lifetime of the lamp compared to the statistical lifetime may be indicated. Also for (mains) voltage, current and power there may be a normal, proper operating range that is indicated along with the actual (predicted) value. Next to the key parameters, the right panel may also illustrate lamp type(s) and key static information such as e.g., lamp color temperature and location. Thus, embodiments of the present system may provide a user with a predicted future view of a lighting system so that parameters may be adjusted accordingly and maintenance may be schedules and/or performed accordingly.

Figure 5:
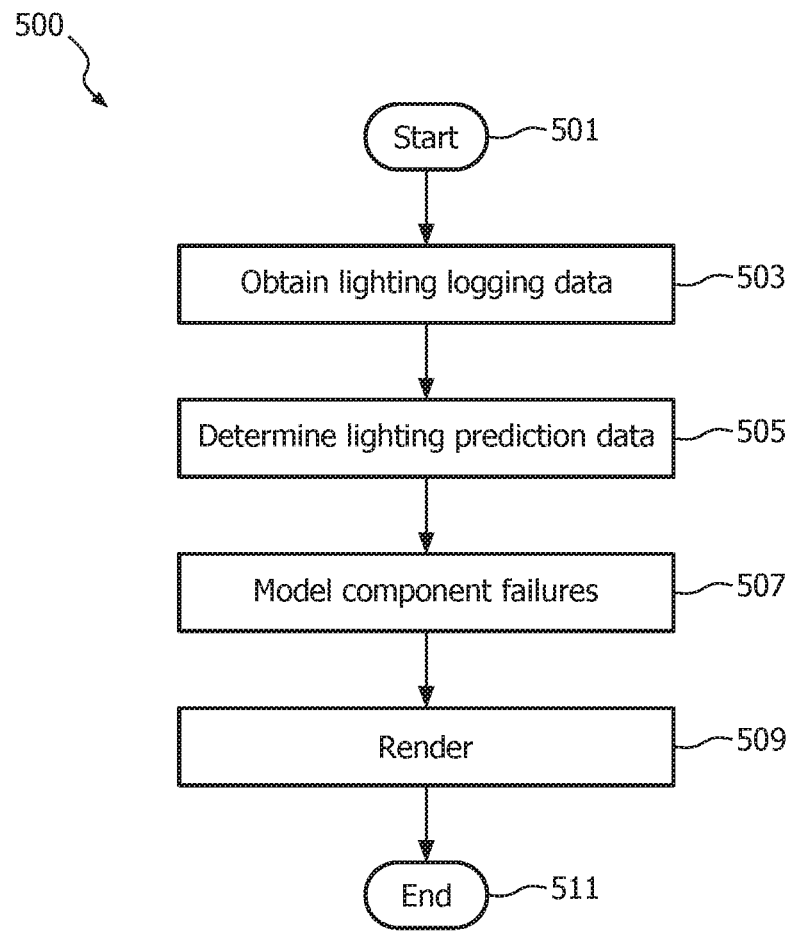
FIG. 5 is a flow diagram that illustrates a process performed by a light system operating accordance with embodiments of the present system.

FIG. 5 is a flow diagram that illustrates a process 500 performed by a light system operating accordance with embodiments of the present system. The process 500 may be performed using one or more computers communicating over a network and may obtain information from, and/or store information to one or more memories which may be local and/or remote from each other. The process 500 can include one of more of the following acts. Further, one or more of these acts may be combined and/or separated into sub-acts, if desired. Further, one or more of these acts may be skipped depending upon settings. In operation, the process may start during act 501 and then proceed to act 503.

During act 503, the process may obtain lighting logging data which may include feature information related to features (f) of the lighting system a plurality of feature spaces. Accordingly, the process may obtain the lighting logging data using a lightpoint data collection process as described with reference to act 205 of FIG. 2. Then, the process may process the lighting logging data to perform data consolidation and identify and/or correct missing and/or incorrect values as may be described with respect to act 207 above. Further, the process may form one or more data sets from the lighting logging data in any suitable format such as by forming an input data set X. The process may perform cleaning operations one or more times to, for example, further clean the input dataset X to replace information that may be determined to be lost and/or incorrect. After completing act 503, the process may continue to act 505.

During act 505, the process may determine lighting prediction data which predicts at least one component failure in the lighting system at a future time in accordance with the lighting logging data and may include at least one complex feature. This may be performed using any suitable method or methods. For example, in accordance with some embodiments, the process may identify informative data features in the input data set X such as complex features using any suitable method such as the method described with respect to act 219 above. Thereafter, the process may determine variable importance and select variables using any suitable method or methods such as the methods as described with respect to acts 221 and 223, respectively. After completing act 505, the process may continue to act 507.

During act 507, the process may model predicted component failures which are predicted to occur at a future time in accordance with the lighting prediction data and maintenance cost. This act may be performed using any suitable method such as the method described with respect to act 225 above. Accordingly, the process may predict component failures such as lamp failures in the lighting system in the future time period (e.g., from a current time to some future time such as Jan. 1, 2040) in light of a costs such as maintenance costs and form a corresponding model of predicted component failures which may optionally be stored in a memory of the system for later use. After completing act 507, the process may continue to act 509.

During act 509, the process may render the modeled predicted component failures on rendering device of the system such as a display of the lighting system. The process may further provide a menu with which a user may interact with the process to view information generated by the process. After completing act 509, the process may continue to act 511 where it ends.

Accordingly, embodiments of the present system may provide lighting services based upon data mining techniques performed in accordance with embodiments of the present system. The present system may use data analytics as good tool for generating better, facts-based insight (R1 and R2) into outdoor lighting systems such as insight into maintenance so as to enable the scheduling of predictive lighting system maintenance.

Predictive maintenance for outdoor lighting may enable maintenance services and systems based on outdoor lighting data collected from the field (R3). In accordance with embodiments of the present system the process may first identify the most important parameters from a maintenance point of view. This enables optimization of the intelligent outdoor lighting system. Secondly, the process may predict failure times during system operation based upon an analysis of the most important parameters. The predicted failure times may then be used to optimize failure repairs, set and monitor performance threshold (e.g., as set forth in performance guarantees), and to visualize the current and future predicted state of the outdoor lighting system. In both of the aforementioned steps, the process may use a statistics-based techniques such as Random Forest (R7) techniques that may adapted in accordance with embodiments of the present system. Random Forests have been used for making determinations in domains such as healthcare, e.g. (R4), electrical grids (R5), and finance (R6). However, the application to lighting operation is new and brings specific challenges which are overcome in embodiments of the present system.

Figure 6:
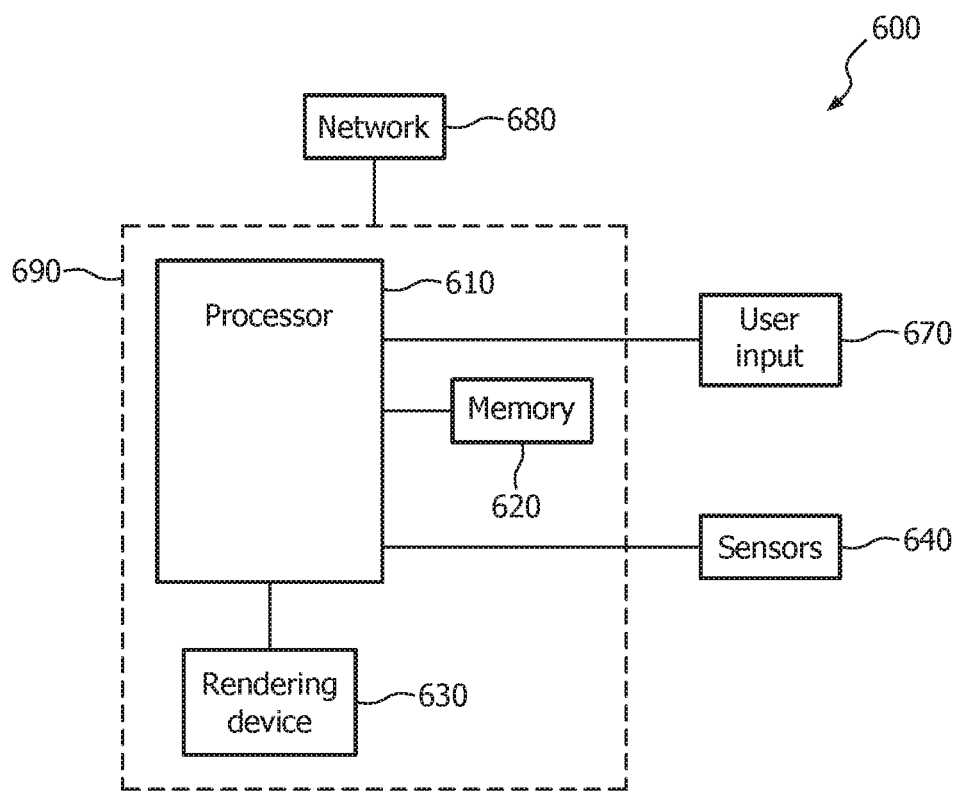
FIG. 6 shows a portion of a system in accordance with embodiments of the present system.

FIG. 6 shows a portion of a system 600 in accordance with embodiments of the present system. For example, a portion of the present system 600 may include a processor 610 (e.g., a controller) operationally coupled to a memory 620, a user interface 630, sensors 640, and a user input device 670. The memory 620 may be any type of device for storing application data as well as other data related to the described operation. The application data and other data are received by the processor 610 for configuring (e.g., programming) the processor 610 to perform operation acts in accordance with the present system. The processor 610 so configured becomes a special purpose machine particularly suited for performing in accordance with embodiments of the present system. The sensors may include sensors such as lamp electrical sensors, dimming level sensors, voltage sensors, current sensors, power sensors, color sensors, light output (lumen) sensors, temperature sensors, vibration sensors, traffic (speed, velocity, flow, etc.) sensors, weather sensors (e.g., temperature, humidity, precipitation, pressure, radar, satellite), radar sensors, ultrasound sensors, etc. which may detect corresponding information and provide this information to the processor 610 for further processing in accordance with embodiments of the present system.

The operation acts may include configuring the system 600 by, for example, configuring the processor 610 to obtain information from user inputs, the sensors 640, and/or the memory 620 and processing this information in accordance with embodiments of the present system to obtain information related to the lighting system operative in accordance with embodiments of the present system. The user input portion 670 may include a keyboard, a mouse, a trackball and/or other device, including touch-sensitive displays, which may be stand alone or be a part of a system, such as part of a personal computer, a notebook computer, a netbook, a tablet, a smart phone, a personal digital assistant (PDA), a mobile phone, and/or other device for communicating with the processor 610 via any operable link. The user input portion 670 may be operable for interacting with the processor 610 including enabling interaction within a UI as described herein. Clearly the processor 610, the memory 620, the UI 630 and/or user input device 670 may all or partly be a portion of a computer system or other device such as a client and/or server as described herein.

Operation acts may include requesting, providing, forming and/or rendering of information such as, for example, information related to the lighting system operating in accordance with embodiments of the present system. The processor 610 may render the information on the UI 630 such as on a display of the system. The sensors may further include suitable sensors to provide desired sensor information to the processor 610 for further processing in accordance with embodiments of the present system.

The methods of the present system are particularly suited to be carried out by processor programmed by a computer software program, such program containing modules corresponding to one or more of the individual steps or acts described and/or envisioned by the present system.

The processor 610 is operable for providing control signals and/or performing operations in response to input signals from the user input device 670 as well as in response to other devices of a network and executing instructions stored in the memory 620. For example, the processors 610 may obtain sensor information from the sensors 640 and may process this information to at least partially determine a status of the system. The sensors may be part of a lighting logging data portion which may provide lighting logging data to the processor 610 for further processing. The processor 610 may include one or more of a microprocessor, an application-specific or general-use integrated circuit(s), a logic device, etc. Further, the processor 610 may be a dedicated processor for performing in accordance with the present system or may be a general-purpose processor wherein only one of many functions operates for performing in accordance with the present system. The processor 610 may operate utilizing a program portion, multiple program segments, or may be a hardware device utilizing a dedicated or multi-purpose integrated circuit.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

REFERENCES

References 1-7 listed below are incorporated herein by reference and are referred to using reference numerals R1 through R7, respectively, throughout the specification. For example, R1 may make reference to the first reference (e.g., Accenture Technology Vision 2013).

(1) Accenture Technology Vision 2013; available at: www.accenture.com/SiteCollectionDocuments/PDF/Accenture-Technology-Vision-2013.
(2) Big data: The next frontier for innovation, competition, and productivity; available at: www.mckinsey.com/insights/business_technology/big_data_the_next_frontier for innovation.
(3) Philips Starsense Outdoor Lighting System; available at: www.lighting.philips.nl/pwc_li/nl_nl/connect/Assets/downloads/online-documentatie/Brochure_starsense_N-L.pdf
(4) E. Hsich et al, Identifying Important Risk Factors for Survival in Patient With Systolic Heart Failure Using Random Survival Forests, Circulation: Cardiovascular Quality and Outcomes, vol. 4, pp. 39-45, 2011.
(5) Dutta, Haimonti, et al. "Estimating the Time Between Failures of Electrical Feeders in the New York Power Grid." Next Generation Data Mining Summit, NGDM (2009).
(6) Chi, Der-Jang, Ching-Chiang Yeh, and Ming-Cheng Lai. "A Hybrid Approach of DEA, rough set theory and random forests for credit rating." International Journal of Innovative Computing, Information and Control 7.8 (2011): 4885-4897.
(7) Breiman, Manual—Setting Up, Using, And Understanding Random Forests V4.0, available at: ftp.stat.berkeley.edu/pub/users/breiman/Using random forests v4.0.pdf, 2003.

The invention claimed is:

1. A lighting system, comprising:
at least one controller which is configured to:
obtain lighting logging data comprising feature information related to features of the lighting system and obtained from a plurality of information sources;
determine a lighting system failure trend using the logging data;
derive, using the lighting system failure tread; at least one complex feature to predict at least one component failure in the lighting system at a future time;

select logging data from the plurality of information sources to predicted component failure;
model predicted component failure in accordance with the at least one complex feature;
store the model in a memory; and
wherein the lighting system further comprises a plurality of lamps, and the modeled predicted component failures comprise predicted lamp failures of two or more lamps of the plurality of lamps and corresponding predicted failure times, wherein the controller is further configured to form a cluster of at least two of the predicted lamp failures in accordance with geophysical location and predicted failure times of corresponding lamps, and wherein the controller is further configured to schedule maintenance to replace the lamps of the cluster at a determined time that is determined to be optimal with respect to the cluster.

2. The system of claim 1, wherein the controller is further configured to render the modeled predicted component failures on a display of the lighting system.

3. The system of claim 1, wherein the controller is further configured to obtain the lighting logging data from at least one of a lamp electrical portion, a system operating information portion, sensors, an installation configuration portion, a weather information portion, a traffic portion, and a crime portion.

4. The lighting system of claim 1, wherein the at least one controller which is further configured to derive at least one informative data feature, using the at least one complex feature, to predict operating performance of the lighting system, wherein the at least one informative data feature includes a polynomial having a degree of 2 and the at least one complex feature includes at least one of a quadratic voltage trend of the lamp at specific points in time, a quadratic trend of the number of times the lamp attempts to ignite before another ignite instruction is given, and quadratic trend of the number of times the lamp spontaneously extinguishes.

5. A method of determining performance of a lighting system, the method performed by at least one controller of the lighting system and comprising acts of:
obtaining lighting logging data comprising feature information related to features of the lighting system and obtained from a plurality of information sources;
determining lighting system failure trend using the logging data;
deriving, using the lighting system failure trend, at least one complex feature to predict at least one component failure in the lighting system at a future time;
selecting logging data from the plurality of information sources to calculate the predicted component failure;
modeling predicted component failures in accordance with the at least one complex feature;
storing the model in a memory; and
wherein the lighting system further comprises a plurality of lamps, and the modeled predicted component failures comprise predicted lamp failures of two or more lamps of the plurality of lamps and corresponding predicted failure times, the method further comprising acts of:
clustering at least two of the predicted lamp failures into a cluster in accordance with geophysical locations and predicted failure times of corresponding lamps; and
scheduling maintenance to replace the lamps of the cluster at a determined time that is determined to be optimal with respect to the cluster in accordance with the model.

6. The method of claim 5, further comprising an act of rendering the predicted component failures on a display of the lighting system.

7. The method of claim 5, further comprising an act of obtaining the lighting logging data from at least one of a lamp electrical portion, a system operating information portion, sensors, an installation configuration portion, a weather information portion a traffic portion, and a crime portion.

8. The method of claim 5, wherein the modeling step includes deriving at least one informative data feature, using the at least one complex feature, to predict operating performance of the lighting system, wherein the at least one informative data feature includes a polynomial has a degree of 2 and the at least one complex feature includes at least one of a quadratic voltage trend of the lamp at specific points in time, a quadratic trend of the number of times the lamp attempts to ignite before another ignite instruction is given, and quadratic trend of the number of times the lamp spontaneously extinguishes.

9. The computer program of claim 8, wherein the model includes deriving at least one informative data feature, using the at least one complex feature, to predict operating performance of the lighting system, wherein the at least one informative data feature includes a polynomial has a degree of 2 and the at least one complex feature includes at least one of a quadratic voltage trend of the lamp at specific points in time, a quadratic trend of the number of times the lamp attempts to ignite before another ignite instruction is given, and quadratic trend of the number of times the lamp spontaneously extinguishes.

10. A computer program stored on a computer readable memory medium, the computer program configured to determine performance of a lighting system, the computer program comprising:
a program portion configured to:
obtain lighting logging data comprising feature information related to features of the lighting system and obtained from a plurality of information sources;
determine a lighting system failure trend using the logging data;
derive, using the lighting system failure tread; at least one complex feature to predict at least one component failure in the lighting system at a future time;
select logging data from the plurality of information sources to calculate the predicted component failure;
model predicted component failure in accordance with the at least one complex feature;
store the model in a memory; and
wherein the lighting system further comprises a plurality of lamps, and the modeled predicted component failures comprise predicted lamp failures of two or more lamps of the plurality of lamps and corresponding predicted failure times, wherein the program portion is further configured to cluster at least two of the predicted lamps failures to form a cluster in accordance with geophysical locations and predicted failure times of corresponding lamps, wherein the program portion is further configured to schedule maintenance to replace the lamps of the cluster at a determined time that is determined to be optimal with respect to the cluster in accordance with the model.

11. The computer program of claim 10, wherein the program portion is further configured to render the predicted component failures on a display of the lighting system.

12. The computer program of claim 10, wherein the program portion is further configured to obtain the lighting logging data from at least one of a lamp electrical portion, a system operating information portion, sensors, an installation configuration portion, a weather information portion, a traffic portion, and a crime portion.

* * * * *